(12) United States Patent
Nicholls

(10) Patent No.: US 10,833,378 B2
(45) Date of Patent: Nov. 10, 2020

(54) VEHICLE BATTERY PACK, A SYSTEM FOR COOLING A BATTERY PACK AND A COOLING PLATE FOR USE IN THE SYSTEM

(71) Applicant: Jaguar Land Rover Limited, Coventry (GB)

(72) Inventor: Stephen Nicholls, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 1622 days.

(21) Appl. No.: 14/406,811

(22) PCT Filed: May 21, 2013

(86) PCT No.: PCT/EP2013/060428
§ 371 (c)(1),
(2) Date: Dec. 10, 2014

(87) PCT Pub. No.: WO2013/186020
PCT Pub. Date: Dec. 19, 2013

(65) Prior Publication Data
US 2015/0140366 A1   May 21, 2015

(30) Foreign Application Priority Data

Jun. 11, 2012   (GB) .................................. 1210278.6

(51) Int. Cl.
*H01M 10/654*     (2014.01)
*H01M 10/625*     (2014.01)
(Continued)

(52) U.S. Cl.
CPC ..... *H01M 10/625* (2015.04); *H01M 10/5016* (2013.01); *H01M 10/5022* (2013.01);
(Continued)

(58) Field of Classification Search
CPC ......... H01M 10/5016; H01M 10/5022; H01M 10/5042; H01M 10/5075; H01M 10/625;
(Continued)

(56) References Cited

U.S. PATENT DOCUMENTS 5,443,926 A   8/1995  Holland et al.
5,582,929 A   12/1996 Dechovich
(Continued)

FOREIGN PATENT DOCUMENTS

CN   101047274 A   10/2007
CN   101577354 A   11/2009
(Continued)

OTHER PUBLICATIONS

International Search Report, PCT/EP2013/060428, dated Sep. 9, 2013, 4 pages.
(Continued)

*Primary Examiner* — Lingwen R Zeng
(74) *Attorney, Agent, or Firm* — Reising Ethington P.C.

(57) ABSTRACT

A system for controlling the temperature of a rechargeable electric battery pack for a vehicle includes a plurality of rechargeable electrochemical storage cells disposed in rows of one or more cells each. The system includes two heat exchanger plates for each of the rows of one or more cells. Each heat exchanger plate is configured to allow heat transfer fluid to flow internally thereof and a first of two heat exchanger plates for one of the rows is configured to allow heat transfer fluid to flow in a first general direction. A second of the two heat exchanger plates for the row is configured to allow heat transfer fluid to flow in a second general direction. The first and second general directions are substantially different to one another.

10 Claims, 17 Drawing Sheets

(51) Int. Cl.
*H01M 10/6567* (2014.01)
*H01M 10/633* (2014.01)
*H01M 10/6551* (2014.01)
*H01M 10/6557* (2014.01)
*H01M 10/647* (2014.01)

(52) U.S. Cl.
CPC ... *H01M 10/5042* (2013.01); *H01M 10/5075* (2013.01); *H01M 10/647* (2015.04); *H01M 10/6551* (2015.04); *H01M 10/6557* (2015.04); *H01M 10/6567* (2015.04); *H01M 2220/20* (2013.01)

(58) Field of Classification Search
CPC .......... H01M 10/647; H01M 10/6551; H01M 10/6557; H01M 10/6567; H01M 2220/20
See application file for complete search history.

(56) References Cited

U.S. PATENT DOCUMENTS

| | | | |
|---|---|---|---|
| 5,728,488 A | 3/1998 | Kranz et al. | |
| 5,927,396 A | 7/1999 | Damsohn et al. | |
| 2001/0038935 A1* | 11/2001 | Yoshimoto | H01M 8/04119 429/413 |
| 2009/0301700 A1 | 12/2009 | German et al. | |
| 2011/0076541 A1 | 3/2011 | Meintschel et al. | |
| 2011/0256431 A1 | 10/2011 | TenHouten et al. | |
| 2011/0300421 A1 | 12/2011 | Iritani et al. | |
| 2012/0028099 A1 | 2/2012 | Aoki | |
| 2012/0028156 A1* | 2/2012 | Song | H01M 8/04007 429/437 |
| 2012/0325447 A1* | 12/2012 | You | F28F 3/048 165/170 |

FOREIGN PATENT DOCUMENTS

| | | |
|---|---|---|
| CN | 102347501 A | 2/2012 |
| CN | 102347509 A | 2/2012 |
| DE | 195 29 880 A1 | 2/1997 |
| DE | 198 49 491 C1 | 1/2000 |
| DE | 10202807 A1 | 8/2003 |
| EP | 0 177 225 A1 | 4/1986 |
| EP | 1 637 709 A2 | 3/2006 |
| KR | 2012 0053135 A | 5/2012 |
| WO | WO 2007/053993 A1 | 5/2007 |
| WO | WO 2007/076985 A2 | 7/2007 |
| WO | WO 2009/046269 A2 | 4/2009 |
| WO | WO 2012/028932 A1 | 3/2012 |

OTHER PUBLICATIONS

Combined Search and Examination Report, Application No. GB1210278.6, dated Sep. 25, 2012, 6 pages.
Notice of Reasons for Refusal, Japanese Patent Application No. 2015-516534, dated Mar. 15, 2016, 9 pages.
Notification of the First Office Action, Chinese Patent Application No. 201380036334.8, dated May 30, 2016, 24 pages.
Combined Search and Examination Report, Application No. GB 1309170.7, dated Nov. 20, 2013, 8 pages.
Examination Report, Application No. GB 1210278.6, dated Apr. 4, 2014, 3 pages.

* cited by examiner

VEHICLE BATTERY PACK, A SYSTEM FOR COOLING A BATTERY PACK AND A COOLING PLATE FOR USE IN THE SYSTEM

RELATED APPLICATIONS

This application is a 35 U.S.C. § 371 national stage application of PCT Application No. PCT/EP2013/060428, filed on May 21, 2013, which claims priority from Great Britain Patent Application No. 1210278.6, filed on Jun. 11, 2012, the contents of which are incorporated herein by reference in their entireties. The above-referenced PCT International Application was published in the English language as International Publication No. WO 2013/186020 A1 on Dec. 19, 2013.

TECHNICAL FIELD

The present invention relates to a battery pack, for example, for an electric vehicle (EV) or a hybrid electric vehicle (HEV). More specifically, but not exclusively, the invention relates to a system for controlling the temperature of a battery pack, wherein two heat exchanger plates, disposed either side of one or more cells of a cell module for the battery pack, are configured and arranged to enable heat transfer fluid to flow in different general directions. In an embodiment, the two heat exchanger plates are configured and arranged to enable a heat transfer fluid to flow in opposing generally diagonal directions to effect more efficient temperature control of the one or more cells. The invention may have particular benefit in a battery pack comprising one or more cell modules comprising rows of more than one cell disposed in series, separated by heat exchanger plates.

Aspects of the invention relate to: a system for controlling the temperature of a battery pack; a heat exchanger plate; a cell module for a battery pack comprising an alternating series of oppositely oriented heat exchanger plates; a vehicle; a method of controlling the temperature of one or more cells in a battery pack; and a method of assembling a battery pack from one or more cell modules comprising two or more heat exchanger plates.

BACKGROUND

Rechargeable electric battery packs (also referred to herein simply as battery packs) typically comprise a series of sealed electrochemical energy storage cells. Some known cells are Lithium-ion based and the power of the overall battery pack is dependent upon a range of characteristics, including for example, the number of cells contained in the battery pack, the state of charge (SOC) of the cells, the temperature of the cells and the voltage being supplied by the cells.

In WO2012/009145A2, to A123 Systems Inc., a battery pack is disclosed in which a retention band is used to maintain a stack of cells together. It is also discloses coupling a cell to a cell heat sink that is formed from a metal plate having the edges bent 90 degrees on one or more sides to form a flanged edge. A housing heat sink is also disclosed, which housing heat sink is also formed of a metal plate having a base with the edges bent 90 degrees on one or more sides to form a flanged edge. The housing heat sink may house the cells such that the flanged edges of the battery cells are in contact with the housing heat sink and an underside of the battery cells are in contact with the base of the housing heat sink to facilitate heat transfer.

The performance, power output, and state of health (SOH) among other characteristics of a rechargeable electric battery may be affected by the operating temperature of the cells. It is therefore desirable to have an improved system for the control and management of the temperature of the cells.

The present invention seeks to provide an improvement in the field of rechargeable electric battery packs by providing an improved system for temperature control and management that may for example be used in vehicles.

The invention may be utilised in applications other than for vehicles and passenger vehicles where rechargeable battery packs are used, for example, the rechargeable battery pack of the invention may find advantageous application in: commercial or utility vehicles, such as fork-lift-trucks; electricity grid storage; portable power generators; and back-up power supplies, for example in telecommunications applications.

SUMMARY

Aspects of the invention provide a system for controlling the temperature of a rechargeable electric battery pack, a heat exchanger plate, a cell module for a rechargeable electric battery pack comprising an alternating series of oppositely oriented heat exchanger plates, a vehicle, a method of controlling the temperature of one or more cells in a rechargeable electric battery pack, and a method of assembling a rechargeable electric battery pack from one or more cell modules and two or more heat exchanger plates.

According to an aspect of the invention for which protection is sought, there is provided a system for controlling the temperature of a rechargeable electric battery pack for a vehicle, the battery pack comprising a plurality of rechargeable electrochemical storage cells disposed in rows of one or more cells each and the system comprising two heat exchanger plates for each of said rows of one or more cells, wherein each heat exchanger plate is structured and arranged to allow heat transfer fluid to flow internally thereof, wherein a first of two heat exchanger plates for one of the rows is configured and arranged to allow heat transfer fluid to flow in a first general direction, wherein a second of two heat exchanger plates for said one of the rows is configured and arranged to allow heat transfer fluid to flow in a second general direction and wherein the first and second general directions are substantially different to one another. This may provide for efficient temperature management of the one or more cells. Advantageously, the average temperature across the one or more cells can be managed and maintained within an optimum operating range. Further, this may advantageously enable the temperature differential (the difference between the highest and lowest temperature of the one or more cells) to be maintained within an acceptable tolerance.

Optionally, the first and second general directions may be generally diagonal and may be generally opposite to one another. This bi-directional coolant flow and cross-over of the coolant flow paths may enable the average temperature of the cells in a row to be better managed to control the average temperature of the cells. This may be especially so where the row contains more than one cell.

Optionally, each heat exchanger plate may comprise one inlet and one outlet and wherein the inlet may be disposed at a higher elevation than the outlet. Advantageously this provides for inputting lowest temperature coolant in the hottest region of the one or more cell to promote more effective cooling of the cells.

Additionally or alternatively, the inlet of each heat exchanger plate may be disposed on the opposite side of the heat exchanger plate to the outlet. This may enable compact packaging of the cells and heat exchanger plates by spacing out the position of the upper and lower most inlets such that on each side of the cell module, each inlet is spaced from an adjacent inlet by a frame member and similarly each outlet is spaced from an adjacent outlet by a frame member.

Optionally, each heat exchanger plate may comprise two faces and wherein one or more physical formations is formed on one or both of the faces for providing an internal guide for urging heat transfer fluid when flowing therein to follow a preferred pathway. Optionally, the inside surfaces of the heat exchanger plates are not smooth and may cause a tumbling movement of the heat transfer fluid flowing therein which may assist in the heat transfer fluid being urged to follow a preferred pathway.

Optionally, the one or more physical formations on one or both of the faces may comprise one or more indentations and/or one or more fins.

Optionally, the one or more physical formations on one or both faces of the heat exchanger plate may comprise a series of fins arranged in substantially parallel relationship. Additionally, the start and termination of each fin of the series of fins may be staggered or offset from the start and termination of each other fin in a gradual and linear manner.

Additionally, the one or more physical formations on one or both faces of the heat exchanger plate may further comprise two spaced linear series of indentations and wherein each indentation of the two series may be substantially spaced from and substantially in horizontal alignment with the start or termination of a fin.

Preferably, but nevertheless optionally, the one or more physical formations may be formed on both faces of the cooling plate and may comprise two linear series of eight indentations each and eight fins, each having a length of about 160 mm, 320 mm or 480 mm and/or each spaced apart by between about 15 mm and about 20 mm.

According to another aspect of the invention for which protection is sought, there is provided a system for controlling the temperature of a rechargeable electric battery pack for a vehicle, the battery pack comprising a plurality of rechargeable electrochemical storage cells disposed in rows of one or more cells each and the system for controlling the temperature of the rechargeable electric battery pack comprising at least one pump for pumping heat transfer fluid about each of two temperature control circuits. This advantageously may enable for accurate control or more variable control of the temperature of the cells.

Optionally, the system for controlling the temperature of the rechargeable electric battery pack may comprise at least two pumps, one for pumping heat transfer fluid about each of two temperature control circuits and the other for pumping heat transfer fluid about a second of two temperature control circuits.

Optionally, each pump may be independently controllable and each pump may be coupled to a control unit.

Additionally, the control unit may be configured to control the flow rate of heat transfer fluid pumped by each of said pumps dependent upon: a measured cell temperature, a measured load on the battery pack, a measured charging rate, a measured heat transfer fluid temperature, and/or a measured ambient temperature.

Optionally, the system may further comprise two heat exchanger plates for each of said rows of one or more cells, wherein each heat exchanger plate may be structured and arranged to allow heat transfer fluid to flow internally thereof, wherein a first of two heat exchanger plates for one of said rows may be configured and arranged to allow heat transfer fluid to flow in a first general direction, wherein a second of the two heat exchanger plates for said row may be configured and arranged to allow heat transfer fluid to flow in a second general direction and wherein the first and second general directions are optionally substantially different to one another, and the system may comprise a heat transfer fluid conditioner, a first temperature control circuit and a second temperature control circuit.

Optionally, the first temperature control circuit may be configured such that a first of the at least two pumps is configured to pump heat transfer fluid away from the heat transfer fluid conditioner along an input pathway toward a first inlet manifold of a first heat exchanger plate into and through the first heat exchanger plate in the first direction, out of the first heat exchanger plate via an outlet manifold, along an outlet pathway and back into thermal contact with the heat transfer fluid conditioner.

Optionally, the second temperature control circuit may be configured such that a second of the at least two pumps is configured to pump heat transfer fluid away from the heat transfer fluid conditioner along an input pathway toward a second inlet manifold of a second heat exchanger plate disposed on the opposite side of the battery pack to the first inlet manifold, into and through the second heat exchanger plate in the second direction, out of the second heat exchanger plate via an outlet manifold, along an outlet pathway and back into thermal contact with the heat transfer fluid conditioner.

According to yet another aspect of the invention for which protection is sought, there is provided a rechargeable electric battery pack for a vehicle comprising a plurality of rechargeable electrochemical storage cells disposed in rows of one or more cells each and a system for controlling the temperature of a rechargeable electric battery pack according to any of the preceding paragraphs.

According to a further aspect of the invention for which protection is sought, there is provided a heat exchanger plate for use in the system for controlling the temperature of a rechargeable electric battery pack according to any of the relevant preceding paragraphs.

According to another further aspect of the invention for which protection is sought, there is provided a method of controlling the temperature of a rechargeable electric battery pack comprising a plurality of rechargeable electrochemical storage cells disposed in rows of one or more cells each and two heat exchanger plates for each of said rows of one or more cells, the method comprising: causing heat transfer fluid to flow internally of a first of said two heat exchanger plates in a first general direction; and causing heat transfer fluid to flow internally of a second of said two heat exchanger plates in a second general direction, wherein the first and second general directions are substantially different to one another.

Optionally, the first direction is generally diagonal from proximate the top of the first heat exchanger plate toward the bottom of the first heat exchanger plate, the second direction is generally diagonal from proximate the top of the second heat exchanger plate toward the bottom of the second heat exchanger plate, and the first and second generally diagonal directions cross-over substantially centrally of the first and second heat exchanger plates.

According to yet another further aspect of the invention for which protection is sought, there is provided a method of controlling the temperature of a rechargeable electric battery pack comprising a plurality of rechargeable electrochemical storage cells disposed in rows of one or more cells each and two heat exchanger plates for each of said rows of one or more cells, the method comprising: providing at least one pump; using a pump for pumping heat transfer fluid about one of two temperature control circuits; and using a pump for pumping heat transfer fluid about a second of two temperature control circuits.

Optionally, the method may further comprise: providing at least two pumps; using a first pump for pumping heat transfer fluid about one of two temperature control circuits; and using a second pump for pumping heat transfer fluid about a second of two temperature control circuits.

Optionally, the method may comprise independently controlling each of said pumps and independently controlling the flow rate of the heat transfer fluid.

Within the scope of this application it is envisaged that the various aspects, embodiments, examples and alternatives set out in the preceding paragraphs, in the claims and/or in the following description and drawings, and in particular the features thereof, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying drawings, in which.

Figure 1:
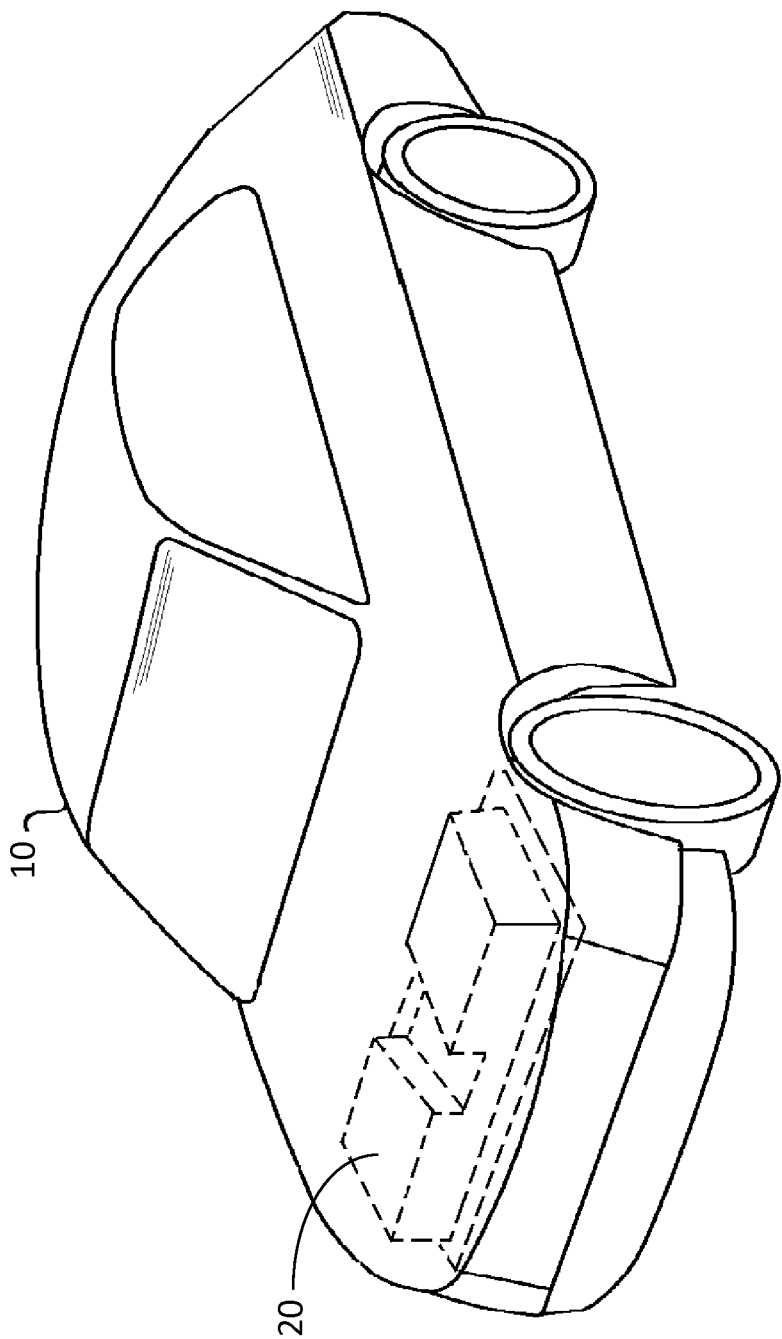
FIG. 1 is schematic perspective view of a vehicle comprising a battery pack according to an embodiment of the invention.

To assist in the understanding of the Figures and the components and features shown therein, the following table of reference numerals with a brief description of the referenced feature is provided:

| Reference Numeral | Brief Description of Referenced Feature | Reference Numeral | Brief Description of Referenced Feature |
| --- | --- | --- | --- |
| 10 | Vehicle | 54 | Cell wings |
| 20 | Battery pack | 56 | Platform |
| 22 | Battery pack cover | 58a, 58b, 158a, 158b | Terminal aperture |
| 24 | Battery pack base | 60 | Notch |
| 26, 126 | Frame | 62a, 62b, 62c, 62d | Spacing beams |
| 30 | End plate | 64 | Frame notch |
| 32a, 32b | Inlet manifold | 66 | Temperature aperture |
| 34a, 34b | Outlet manifold | 68 | Temperature support tab |
| 36 | Module | 70 | Temperature groove |
| 38 | Temperature sensor (thermistor) | 72 | Cooling plate location notch |
| 40a | Positive cell terminal | 74a, 74b | Cooling plate inlet/outlet formation |
| 40b | Negative cell terminal | 76 | Manifold fixing apertures |
| 42 | Heat exchanger plate (also referred to as cooling plate and first heat exchanger) | 78, 80, 90 | Primary module affixing holes |
| 44 | Cell pouch | 83 | Cooling plate tab |

-continued

| Reference Numeral | Brief Description of Referenced Feature | Reference Numeral | Brief Description of Referenced Feature |
| --- | --- | --- | --- |
| 46 | Foam block | 85 | Bolt |
| 48 | Foam cell (foam layer) | 86, 88 | Frame sides |
| 50a, 50b | Cooling Plate Inlet | 92A | Assembled 'A' - frame |
| 52a, 52b | Cooling Plate Outlet | 92B | Assembled 'B' - frame |
| 82, 84 | Dividers | 95 | Frame body |
| 193 | Notch/formation | 96, 196 | Top section |
| F | Frame front face | R | Frame rear face |
| 100 | System for controlling temperature of battery pack cells | 110a, 110b | Output heat transfer fluid pathway |
| 102 | Control unit | 108a, 108b | Input heat transfer fluid pathway |
| 105 | Heat transfer fluid conditioner | | |

DETAILED DESCRIPTION OF EMBODIMENTS

Detailed descriptions of specific embodiments of the battery pack, modules, frames and methods of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the battery pack, modules, frames and methods described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

In FIG. 1 there is shown a vehicle 10 that may optionally be an electric vehicle (EV) having a battery pack 20 for providing electrical power for propulsion of the vehicle 10. The battery pack 20 is coupled to a drive train of the vehicle 10, in particular to a motor (not shown) to provide energy to the motor. The battery pack 20 may optionally comprise two main packs. In other envisaged embodiments, the battery pack 20 may comprise a single pack or more than two main packs. In yet other envisaged embodiments, the vehicle 10 is not a fully electric vehicle, but rather a hybrid electric vehicle (HEV), for example a plug-in hybrid electric vehicle (PHEV). In yet other envisaged embodiments, the vehicle 10 may not be driven solely or in part by electric power, but may nevertheless comprise a rechargeable electric battery pack 20 for providing electrical power to electronic components other than an electric motor of a drivetrain of a vehicle 10. Other applications for a battery pack 20 are envisaged, for example, electrical power storage for portable power sources; electric grid; renewable energy generators; and back-up power supply.

Figure 2A:
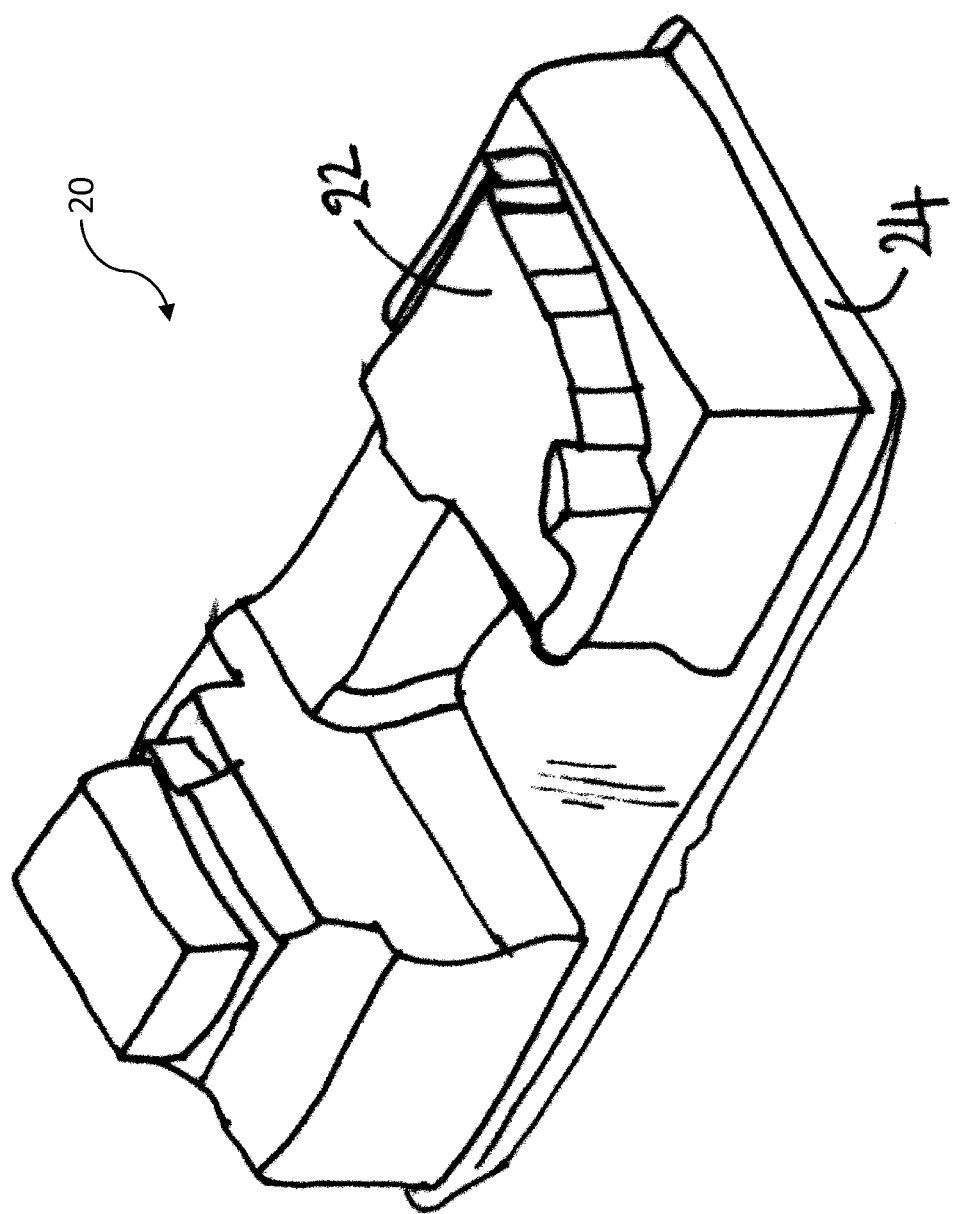
FIG. 2A is a schematic perspective view of a battery pack according to an embodiment of the invention.

An optional battery pack 20 according to an exemplary embodiment of the invention is illustrated schematically in FIG. 2A. The battery pack 20 optionally comprises a battery pack base 24 and a battery pack cover 22. The battery pack base 24 provides a surface for supporting the components of the battery pack 20 and the battery pack cover 22 provides a protective barrier to prevent or reduce the ingress of, for example dust, moisture and dirt, into the battery pack 20. The shape, size, configuration and structure of the base 24 and cover 22 may be altered dependent upon the shape, size, configuration and structure of the battery pack 20 contained therein.

Figure 2B:
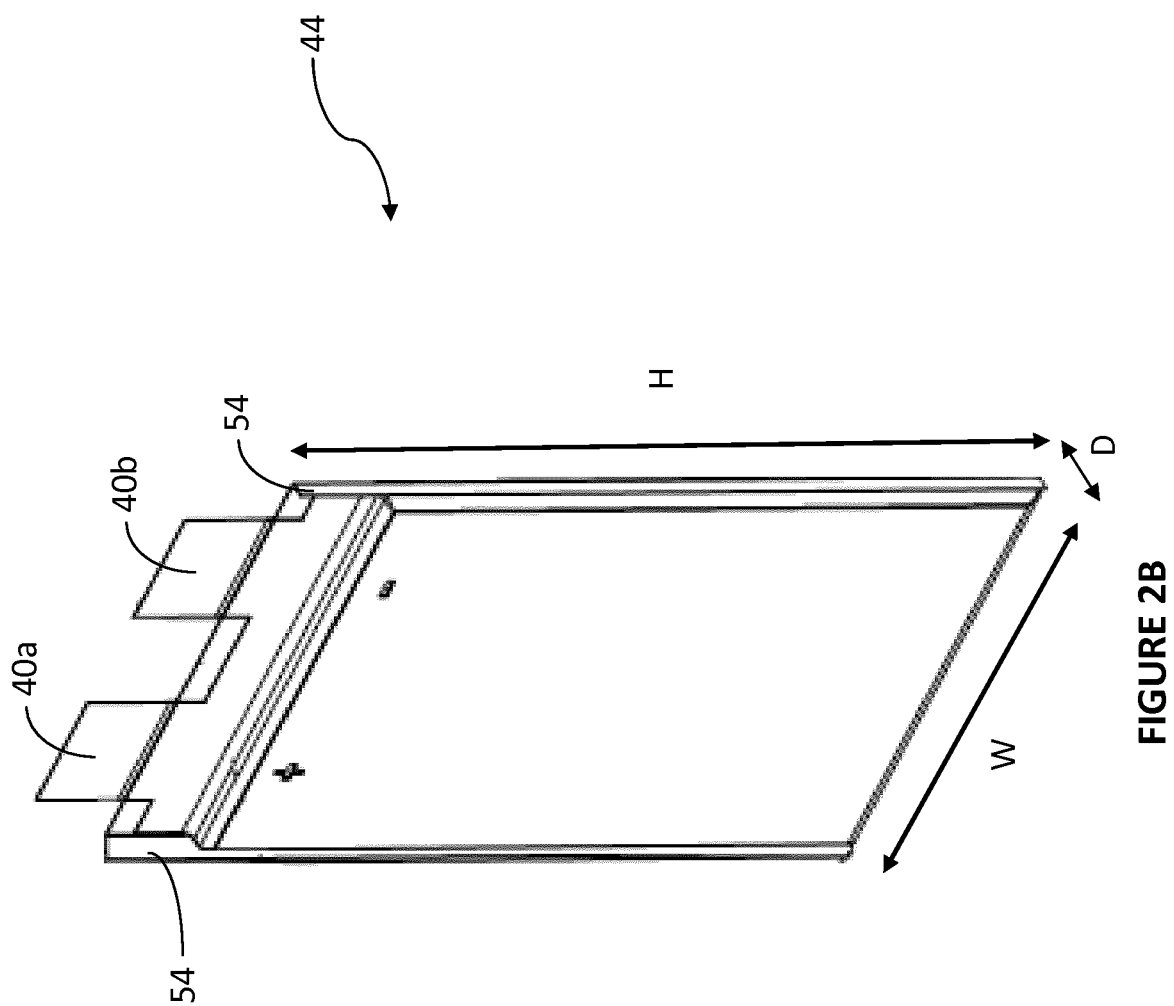
FIG. 2B is a schematic perspective view of a rechargeable electrochemical storage cell pouch according to an embodiment of the invention.
Figure 4:
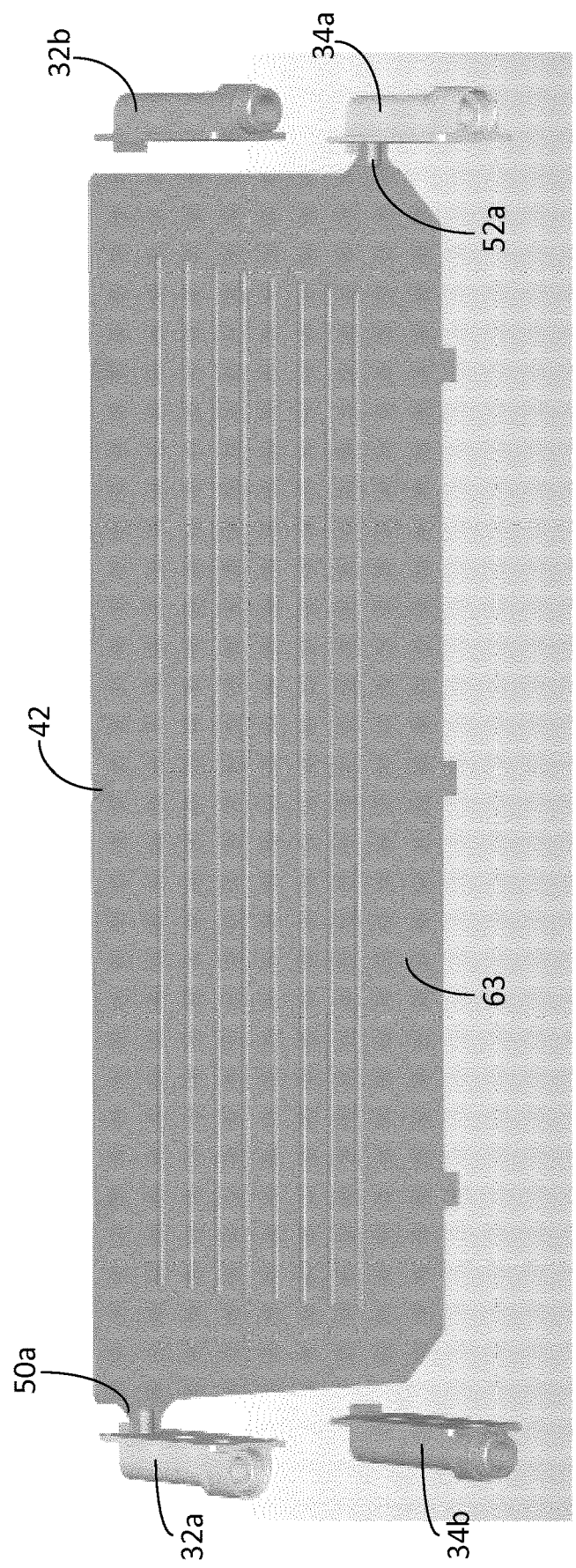
FIG. 4 is an illustration of the front face of the cooling plate of FIGS. 3A and 3B showing the optional connection and positioning of inlet and outlet manifolds of a cooling system.

The battery pack 20 comprises a plurality of sealed rechargeable electrochemical energy storage cells 44, an example of which is shown schematically in FIG. 2B. The rechargeable electrochemical energy storage cells 44 may also be referred to herein as cells, pouches and cell pouches 44. Optionally, each cell 44 may be a Li-ion (Lithium-ion) based electrochemical energy storage cell 44. In other envisaged embodiments alternative suitable electrochemical storage cells 44 or combinations thereof may be used. Each cell 44 comprises a pair of terminals 40a, 40b, optionally provided as tabs 40a, 40b protruding upwardly of the cell 44 when disposed in a generally upright orientation (as shown for example in FIGS. 2B, 4A and 4B). Each cell 44 may optionally comprise a cell wing 54 on each side thereof, which cell wing 54, may be formed of Aluminium sheet. According to one optional embodiment, the cell 44 may have width (W), depth (D) and height (H) dimensions of about 160 mm, about 7 mm and about 227 mm respectively.

Figure 2C:
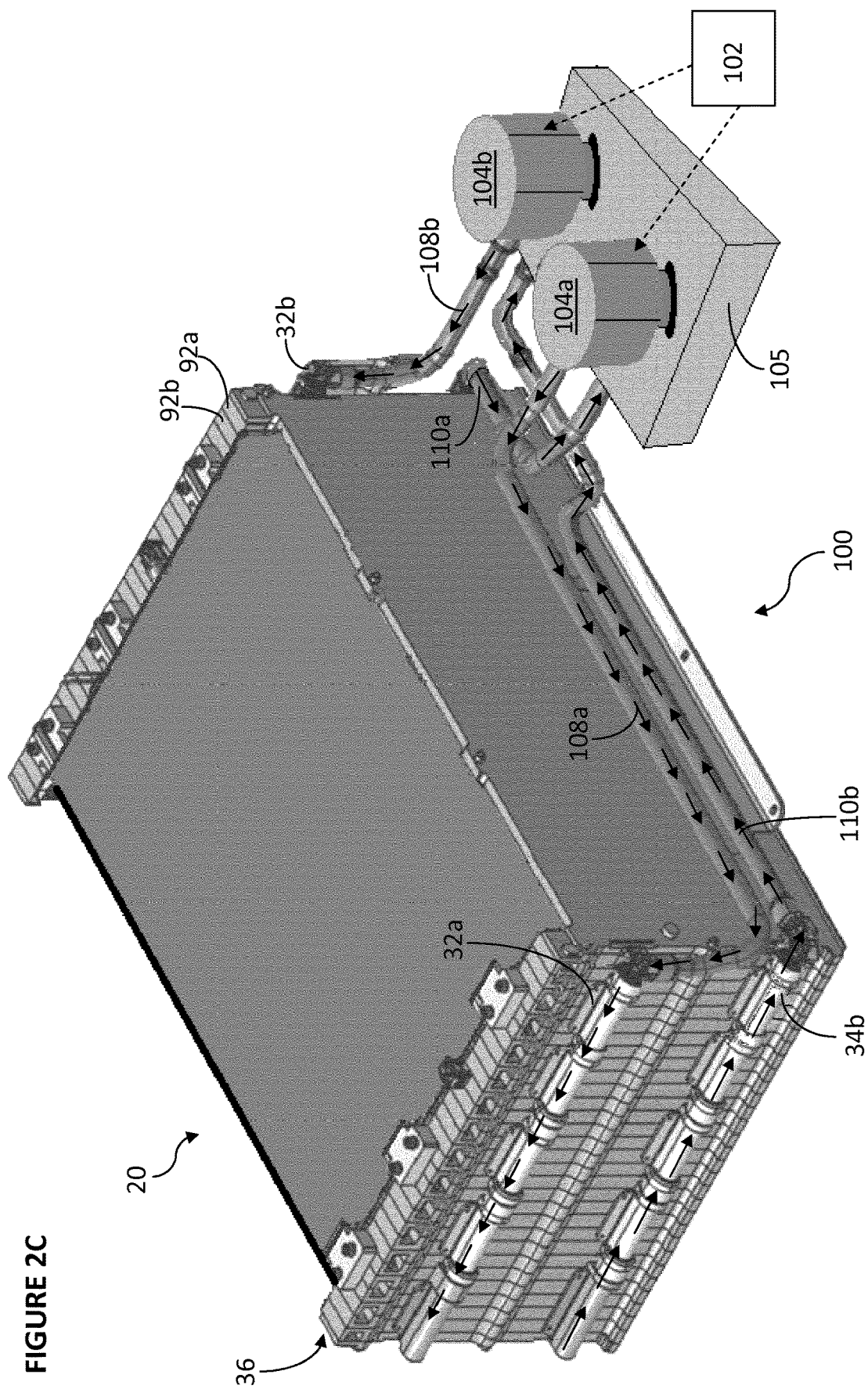
FIG. 2C is a schematic illustration of a cooling system according to an embodiment of the invention.

The battery pack 20 additionally comprises a temperature control system 100 shown schematically in FIG. 2C for monitoring and adjusting the temperature of the cells 44 contained in the battery pack 20. The control of the temperature of the cells 44 is desirable in order to optimise the performance of the battery pack 20. The cells 44 should be maintained at an optimum temperature or within an optimum temperature range. Optionally, the optimum temperature or range may be between about 32° C. and about 37° C. and preferably but nevertheless optionally the optimum temperature may be about 35° C. The temperature control system 100 may also be referred to herein as a cooling system 100 since it is more typical that the temperature control system 100 will be used to manage cooling of the cells 44 of the battery pack 20. Nevertheless, it will be recognised that in certain conditions, i.e. very cold environments it may be necessary to warm the cells 44 in order to achieve the optimum temperature of optionally about 35° C.

In addition to the temperature control (cooling) system 100, the battery pack 20 may comprise additional components (not shown), for example, electronic circuitry for managing, controlling and balancing the electric charge and discharge of individual cells 44.

According to an exemplary and illustrative non-limiting embodiment, a temperature control system (also referred to as cooling system) 100 comprises: a control unit 102; one or more pumps 104a, 104b for circulating heat transfer fluid (herein also referred to as coolant) around the cooling system 100; a plurality of first heat exchangers (also referred to as heat exchanger plates and cooling plates) 42 disposed within a cell module 36 of the battery pack; one or more heat transfer fluid conditioners 105; pipework for routing the heat transfer fluid in pathways 108*a*, 108*b*, 110*a*, 110*b* about the temperature control system 100; one or more inlet manifolds 32*a*; and one or more outlet manifolds 32*b*.

An aspect of the present invention is primarily directed to the temperature control of the cells 44 and has particular benefit in a battery pack 20 where cells 44 are disposed in rows of more than one cell 44. In such, and other arrangements, planar metallic plates (such as those disclosed in WO2012/009145A2) may not provide for sufficient cooling of the cells and/or are not adaptable or controllable when in use.

Optionally, the battery pack 20 may comprise more than one cell 44 arranged in rows, which rows are stacked next to one another to create a matrix, array or series of cells 44. In this way, rather than stacking single cells 44 next to one another (as disclosed in WO2012/009145A2), the battery pack 20 and/or cell module 36 described herein (for example, see FIG. 6C) may comprise more than one cell 44 in each row. Preferably, but nevertheless optionally, three cells 44 are disposed side by side in a row contained by a frame 26 (see FIGS. 6A and 6B). The cells 44 of each framed row are sandwiched between a pair of first heat exchangers 42 formed as heat exchanger plates 42. Heat exchanger plates 42 according to optional embodiments of an aspect of the invention are shown in FIGS. 3A, 3B, 4, 5A, 5B, 6A, 6B, 6D and 8.

Figure 3A:
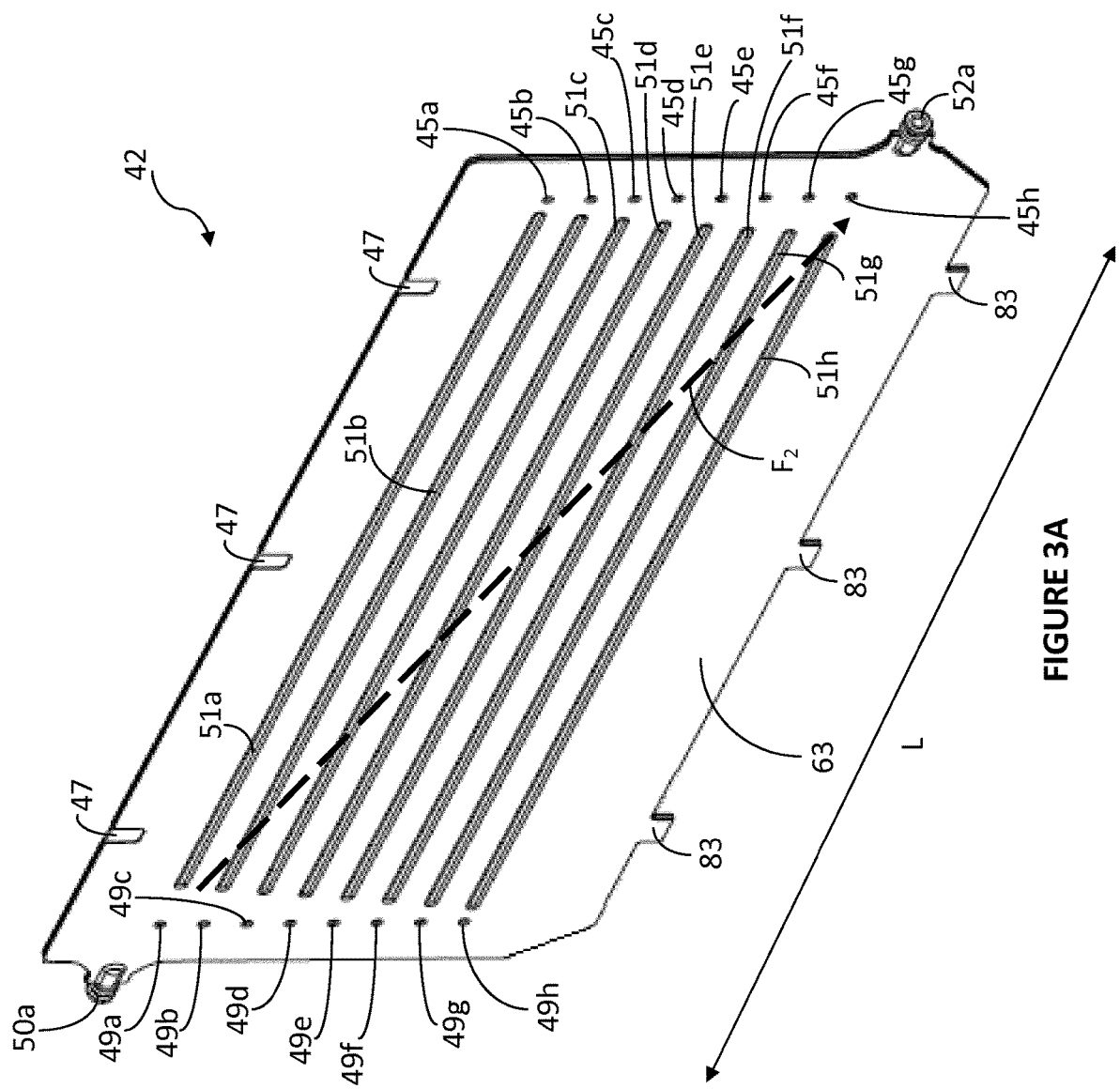
FIG. 3A is a perspective view from the top, front face and side of a cooling plate for use in forming a battery pack according to an embodiment of the invention.

The heat exchanger plates 42 are suitably sized (for example the length and height thereof) in accordance with the overall size of the cells 44 (determined by the number of and size of the individual cells 44) that are disposed in each row between the heat exchanger plates 42. As such in other embodiments of the invention the heat exchanger plates 42 may have a shorter length (L) (length (L) being the dimension between the sides of the heat exchanger plates 42 as shown in FIG. 3A) to make them suitable for being disposed next to rows of cells containing only one or only two cells 44 or may have a longer length to make them suitable for being disposed next to rows of cells containing more than two cells 44 and/or may be of different height to match the height Cy of a cell 44 and/or may be of different width to match the width Cx of a cell 44.

In an exemplary embodiment, a temperature control system 100 according to an aspect of the invention, comprises two pumps 104*a*, 104*b*, each optionally independently controllable by one or more control units 102. In the illustrated embodiment, each pump 104*a*, 104*b* is coupled to a control unit 102. In other envisaged embodiments of the invention, each pump 104*a*, 104*b* is coupled to a separate control unit 102. The control unit 102 is configured such that it can control, manage and adapt the frequency or speed of each pump 104*a*, 104*b*. Thereby, the volumetric flow rate of heat transfer fluid being circulated by each pump 104*a*, 104*b* is controllable independently of the other pump 104*b*, 104*a*.

The control unit 102 may be coupled directly to a temperature sensor 38 which is coupled to each cell 44 of the battery pack 20. In other embodiments, the control unit 102 is indirectly coupled to a temperature sensor 38 and/or may receive information about the temperature of each cell 44. Additionally or alternatively the control unit 102 may receive information about an average temperature of the cells 44 contained within the battery pack 20. This and other information may be used to determine a required rate of heating or cooling, in other words a desired degree of temperature management. In dependence on a desired degree of temperature management, the control unit 102 may be configured to control or otherwise manage flow rate of heat transfer fluid (coolant) that should be achieved by the pumps 104*a*, 104*b*. In other envisaged embodiments of the invention the speed/frequency of one or both of the pumps 104*a*, 104*b* may be fixed and not changeable by a control unit 102. In other embodiments of the invention the control of the speed/frequency of the pumps 104*a*, 104*b* may depend on factors in addition or alternative to the temperature of the cells 44. In other envisaged embodiments, one or both pumps 104*a*, 104*b* has a fixed frequency or rotational speed and the flow rate is managed and varied by the provision of a variable valve or a bypass circuit.

The temperature control (cooling) system 100 optionally comprises two independent temperature control (cooling) circuits 108*a*/108*b*, 110*a*/110*b*.

A first temperature control circuit 108*a*, 110*a* comprises: a pump 104*a*; one or more first heat exchanger plates 42; a heat transfer fluid conditioner 105; an input pathway 108*a*; inlet manifolds 32*a*; outlet manifolds 34*a*; and an outlet pathway 110*a*. The heat transfer fluid conditioner 105 is disposed in thermal contact with heat transfer fluid for transferring heat from the heat transfer fluid (or alternatively transferring heat to the heat transfer fluid). The heat transfer fluid conditioner 105 thereby generates a supply of temperature controlled heat transfer fluid (typically cooled heat transfer fluid) which is pumped away from the pump 104*a*, along the input pathway 108*a* and toward inlet manifolds 32*a*. From there the temperature controlled heat transfer fluid (typically cooled heat transfer fluid) flows into and through the one or more first heat exchanger plates 42 to manage the temperature of the cell(s) 44 adjacent to the heat exchanger plates 42. To cause cooling of the cells 44, heat energy is transferred from the cells 44 via the heat exchanger plates 42 to the heat transfer fluid. The temperature of the heat transfer fluid is thereby increased.

The heat transfer fluid, at an altered temperature (typically hotter if heat energy from the cell(s) 44 has been transferred to it), is then pumped out of the one or more heat exchanger plates 42 via outlet manifolds 34*a* (not visible in FIG. 2C), along an outlet pathway 110*a*, and back into thermal contact with the heat transfer fluid conditioner 105. Upon returning to the heat transfer fluid conditioner 105 the temperature of the heat transfer fluid can be conditioned and thus managed. Typically, heat energy from the heat transfer fluid may be transferred to the heat transfer fluid conditioner 105. The heat transfer fluid is then ready for managing the temperature of the cells 44 as it circulates though the first temperature control circuit 108*a*, 110*a*.

Similarly, the second temperature control circuit 108*b*, 110*b* comprises: a pump 104*b*; two or more first heat exchanger plates 42; a heat transfer fluid conditioner 105; an input pathway 108*b*; inlet manifolds 32*b*; outlet manifolds 34*b*; and an outlet pathway 110*b*. The heat transfer fluid conditioner 105 is disposed in thermal contact with heat transfer fluid for transferring heat energy from heat transfer fluid (or optionally transferring heat energy to the heat transfer fluid). The heat transfer fluid conditioner 105 thereby generates a supply of temperature controlled heat transfer fluid (typically cooled heat transfer fluid) which is pumped away from the pump 104*b* along the input pathway 108*b* and toward inlet manifolds 32*b*. From there the temperature controlled heat transfer fluid (typically cooled heat transfer fluid) flows into and through one or more heat exchanger plates 42 to manage the temperature of the cell(s) 44 adjacent to the heat exchanger plates 42. To cause cooling of the cells 44, heat energy is transferred from the cells 44 via the heat exchanger plates 42 to the heat transfer fluid. The temperature of the heat transfer fluid is thereby increased.

The heat transfer fluid at an altered temperature (typically hotter since heat energy from the cell(s) 44 has been transferred to it to cool the cells 44) is then pumped out of the one or more heat exchanger plates 42 via outlet manifolds 34*b*, along an outlet pathway 110*b*, and back into thermal contact with the heat transfer fluid conditioner 105. Upon returning to the heat transfer fluid conditioner 105 the temperature of the heat transfer fluid can be managed ready for managing the temperature of the cells 44 as it circulates though the first temperature control circuit 108*b*, 110*b*.

In the illustrated embodiment, the heat transfer fluid conditioner 105 is coupled to an air conditioning unit of the vehicle 10. The air conditioning unit comprises a compressor to increase the pressure of a refrigerant and cause it to release heat energy thereby cooling it. The heat transfer fluid of the temperature management system 100 is pumped into thermal contact with cooled refrigerant and/or cooled air from the air conditioning unit in order to transfer heat from the heat transfer fluid to the refrigerant and/or cold air of the air conditioning unit of the vehicle 10. The heat transfer fluid conditioner 105 is therefore configured to only cool the heat transfer fluid.

In other envisaged embodiments, the heat transfer fluid conditioner 105 comprises a heater and/or more than one heat exchanger. Optionally, the heat transfer fluid conditioner 105, in other envisaged embodiments is coupled to a control unit which may determine the cooling (or heating) rate of the heat transfer fluid by the heat transfer fluid conditioner 105. Other suitable mechanisms may be used for controlling the temperature of the heat transfer fluid at the second heat exchanger 105.

The provision of two circuits provides for temperature controlled (optionally cooled) heat transfer fluid to be delivered on two sides of the cell module 36 simultaneously. This may provide for efficient temperature control of the cells 44 disposed within the cell module 36 of the battery pack 20 as well as increased control.

The control unit 102 is configured to control the flow rate of the heat transfer fluid about the first and second temperature control circuits, optionally to adjust the cooling rate, cooling efficiency and/or to achieve a specified optimum cell 44 temperature. Optionally, the control of the flow rate of each of the at least two pumps is dependent upon any one or a combination of: a measured cell temperature; a measured load on the battery pack; a measured (maximum, minimum and/or average) charging rate of the cells; a measured (maximum, minimum and/or average) heat transfer fluid temperature; and/or a measured (maximum, minimum and/or average) ambient temperature.

In other envisaged embodiments, both the first and second temperature control circuits are driven by a single pump and appropriate pipework is used for the passage of heat transfer fluid on either side of the cell module 36.

Figure 3B:
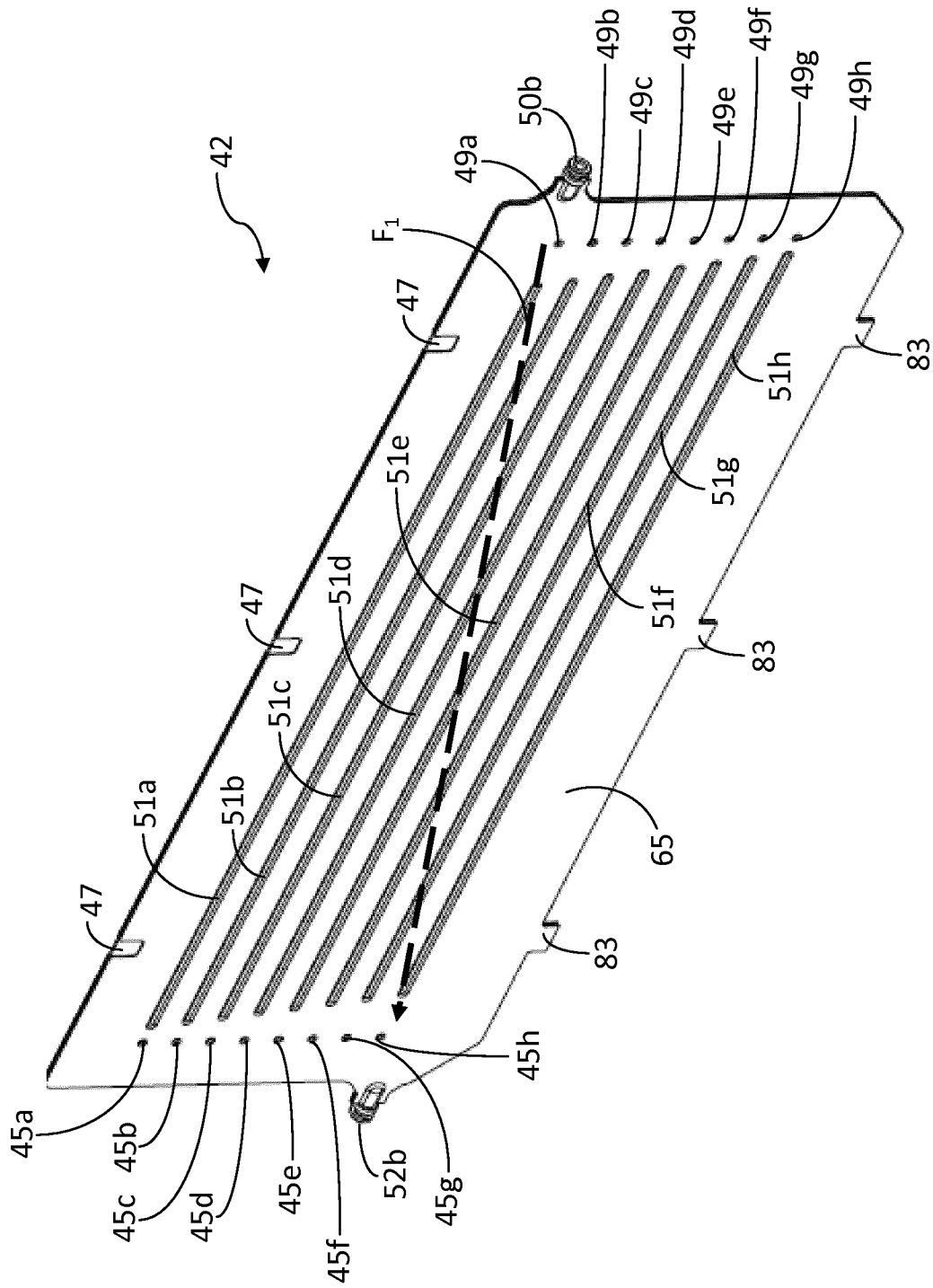
FIG. 3B is a perspective view from the top, rear face and side of the cooling plate shown in FIG. 3A.

Reference is made to FIGS. 3A and 3B wherein a heat exchanger plate/cooling plate 42 is illustrated. In FIG. 3A, the front face 63 of the cooling plate 42 is outermost whereas in FIG. 3B, the rear face 65 of the cooling plate 42 is illustrated outermost. The cooling plate 42 may be constructed of two metallic sheets. The metallic sheets may be formed, for example pressed. The metallic sheets may be constructed from a single metal, for example aluminium or from a combination of more than one metallic material. The two faces 63, 65 optionally brazed together. A cavity is created between the two faces of the cooling plate 42. The cooling plate 42 may be about 620 mm by about 157 mm.

An inlet 50*a* is provided optionally at an upper portion of the cooling plate 42 on a left-hand side thereof when viewed from the front face 63 as in FIG. 3A. An outlet 52*a* is provided optionally at a lower portion of the cooling plate 42 on a right-hand side thereof when viewed from the front face 63 as in FIG. 3A. In the opposing orientation, as shown in FIG. 3B, the inlet 50*b* is provided optionally at an upper portion of the cooling plate on a right-hand side thereof (when viewed from the rear face 65 as in FIG. 3B). An outlet 52*b* is provided optionally at a lower portion of the cooling plate on a left-hand side thereof (when viewed from the rear face 65 as in FIG. 3B).

As such heat transfer fluid (for example a glycol based heat transfer fluid), can be input into the cavity in the cooling plate 42 via the inlet 50*a* or 50*b* and can flow though the cavity, where, because it is in thermal contact with the metallic heat exchanger plate 42 which is in thermal contact with a cell 44 heat exchange between the cell 44 and heat transfer fluid can occur. In other words, the coolant can be heated (or cooled), albeit indirectly, by the cells 44. As the coolant transfers heat energy away from the cells 44 (or transfers heat energy to the cells 44 in a heating application), the temperature of the cells 44 decreases (or increases). The coolant flows out of the cooling plate 42 via outlet 52*a* or 52*b*.

The chemistry of the cells 44 and/or the upright orientation of the cells 44 may cause an uneven distribution of heat across the cell pouch 44. Optionally therefore, the cooling plate 42 provides for the coolant to be inlet (when it is at its lower temperature) closest to an area of the cells 44 that typically has the highest temperature. In one embodiment, the cells 44 are typically of higher temperature nearer their tops and as such in one embodiment of the invention the inlet 50*a*, 50*b* of the cooling plate 42 is at the top of the cooling plate 42. Optionally, the inlet 50*a*, 50*b* and outlet 52*a*, 52*b* are positioned at the edges of the cooling plates 42 so that the planar and narrowest width parts of the cooling plates 42 can be disposed between cells 44 for efficient and compact packaging of the cells 44. In other embodiments, the inlet 50*a*, 50*b* may be alternatively positioned and/or more than one inlet may be provided. Optionally, the cooling plates 42 are configured such that the coolant exits the cooling plate 42 (when it is at its highest temperature having acquired heat from the cells 44) closer to a location where the cells 44 are typically of lowest temperature.

In FIG. 3A, the general flow direction of coolant within the cooling plate 42 when viewed from the front face 63 is illustrated by a line F2. Similarly, in FIG. 3B the general flow direction of coolant within the cooling plate 42 when viewed from the rear face 65 is illustrated by a line F1. The first general flow direction F2 and second general flow direction F1 are different to one another. Optionally, the first general flow direction F2 and second general flow direction F1 are generally diagonal and oppositely directed. For control of different types of cell (44) and/or differently arranged cells and/or differently packaged cells, the general flow directions F1, F2 may be differently oriented in order to achieve optimum cell temperature management.

A further consideration in the temperature management of the cells 44 is the differential temperature across the cell(s) 44. The differential temperature is the difference between the hottest temperature part and the lowest temperature part of the cell(s) 44. Optionally, the differential temperature may be managed by the oppositely flowing heat transfer fluid provided by the present disclosure and optionally may be kept to less than about 10° C.

Optionally the or each face 63, 65 of the heat exchanger plate 42 may comprise one or more physical formations 51a, 51b, 51c, 51d, 51e, 51f, 51g, 51h; 49a, 49b, 49c, 49d, 49e, 49f, 49g, 49h' 45a, 45b, 45c, 45d, 45e, 45f, 45g, 45h for guiding the general flow path of the heat transfer fluid. This is to encourage or urge the coolant/heat transfer fluid to flow in a particular path or direction. The one or more formations 51a, 51b, 51c, 51d, 51e, 51f, 51g, 51h; 49a, 49b, 49c, 49d, 49e, 49f, 49g, 49h' 45a, 45b, 45c, 45d, 45e, 45f, 45g, 45h may provide an internal guiding means to urge or encourage the incoming coolant to flow at least a short way across the top of the cooling plate before flowing down the cooling plate.

In one exemplary non-limiting illustrative embodiment, the physical formations comprise a series of one or more fins 51a, 51b, 51c, 51d, 51e, 51f, 51g, 51h. The fins 51a, 51b, 51c, 51d, 51e, 51f, 51g, 51h are physically formed on the front face 63 of the cooling plate 42 (see FIG. 3A). Additionally an optional series of one or more fins 51a, 51b, 51c, 51d, 51e, 51f, 51g, 51h, is physically formed on the rear face 65 of the cooling plate 42 (see FIG. 3A). As viewed from the outside of the cooling plate 42, the one or more fins 51a, 51b, 51c, 51d, 51e, 51f, 51g, 51h on the front and rear faces 63, 65 may appear as debossments. In other words, as viewed from the inside of the cooling plate 42 the one or more fins 51a, 51b, 51c, 51d, 51e, 51f, 51g, 51h are embossments. Optionally a series of eight fins is provided on each face 63, 65. Optionally the one or more fins 51a, 51b, 51c, 51d, 51e, 51f, 51g, 51h are substantially parallel with one another. Optionally the one or more fins 51a, 51b, 51c, 51d, 51e, 51f, 51g, 51h are substantially parallel with top and bottom edges of the cooling plate 42. Optionally the one or more fins 51a, 51b, 51c, 51d, 51e, 51f, 51g, 51h are about 480 mm±20 mm in length. Optionally the spacing between the fins is between about 15 mm and about 20 mm and preferably but nevertheless optionally about 17 mm. Optionally, the start and termination of each fin 51a, 51b, 51c, 51d, 51e, 51f, 51g, 51h is staggered relative to the fin above and/or below.

In another exemplary embodiment, the one or more physical formations may alternatively or additionally comprise one or more indentations 49a to 49h and 45a to 45h (as viewed from the outside of the cooling plate 42). Optionally, the one or more optional indentations 49a to 49h and 45a to 45h are provided in alignment with the fins 51a, 51b, 51c, 51d, 51e, 51f, 51g, 51h. Relative to the indentations 49a to 49h and 45a to 45h the start and termination of each fin 51a, 51b, 51c, 51d, 51e, 51f, 51g, 51h may be staggered. Optionally, closest to the inlet 50a, 50b, the start of the top most fin 51a is spaced furthest from a top most indent 49a. Gradually the spacing between the indent 49b to 49h and the start of the adjacent fin 51b, 51c, 51d, 51e, 51f, 51g, 51h decreases.

The optionally physical formations such as fins 51a, 51b, 51c, 51d, 51e, 51f, 51g, 51h provided on the front face 63 of the cooling plate 42 may be symmetrical or asymmetrical relative to the formations provided on the rear face 65.

Furthermore, where more than one cell 44 is provided in adjacent rows, the coolant travels a longer path (proportional to the width X of the cells 44) and gains more heat energy compared to when only one cell 44 is provided in a row. The coolant may therefore be less effective at cooling the cells 44 positioned furthest from the coolant inlet 32a, 32b than it is at cooling the cells 44 positioned closest to the coolant inlet 32a, 32b. Therefore according to another beneficial, optional aspect of the invention, the cooling plates 42 either side of a row of cells 44 are disposed in opposite configurations. As such each cell 44 either is disposed between the front faces 63 of two cooling plates 42, or is disposed between the rear faces 65 of two cooling plates 42.

Figure 5A:
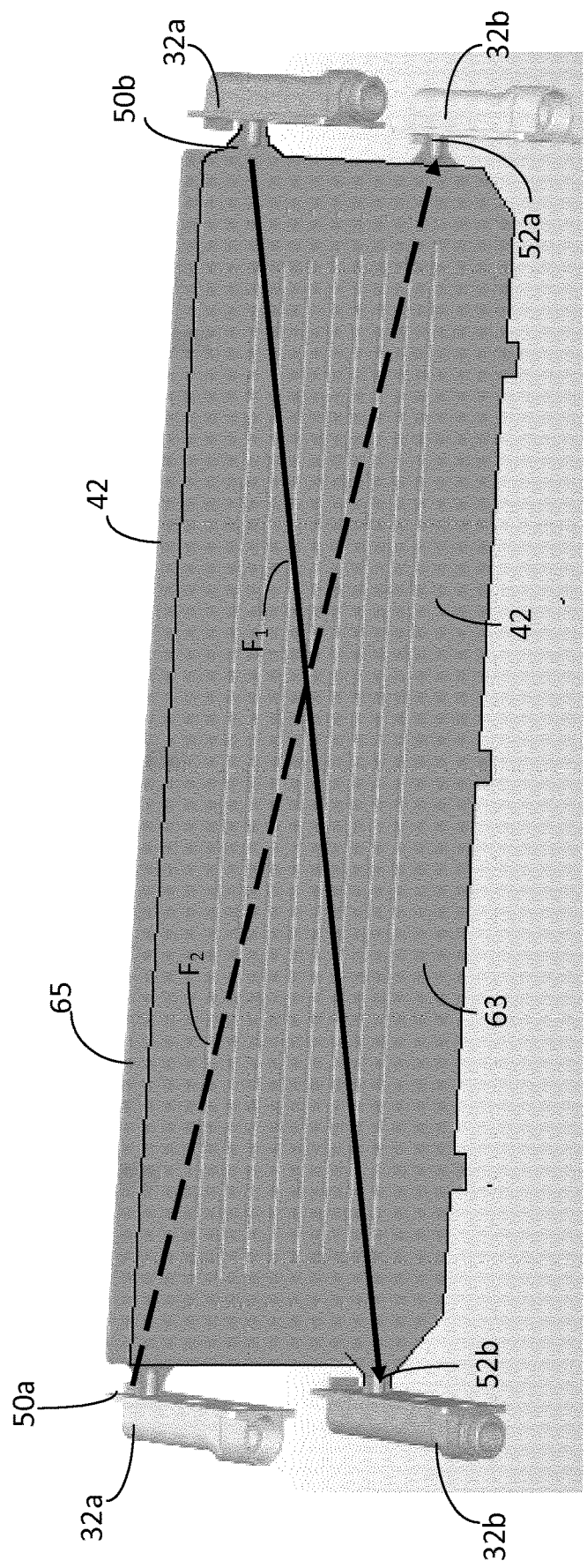
FIG. 5A is a top and rear face view of a pair of plates disposed in spaced, opposing relationship, between which three cells, for example three of the cells depicted in FIG. 2B, may be disposed.
Figure 5B:
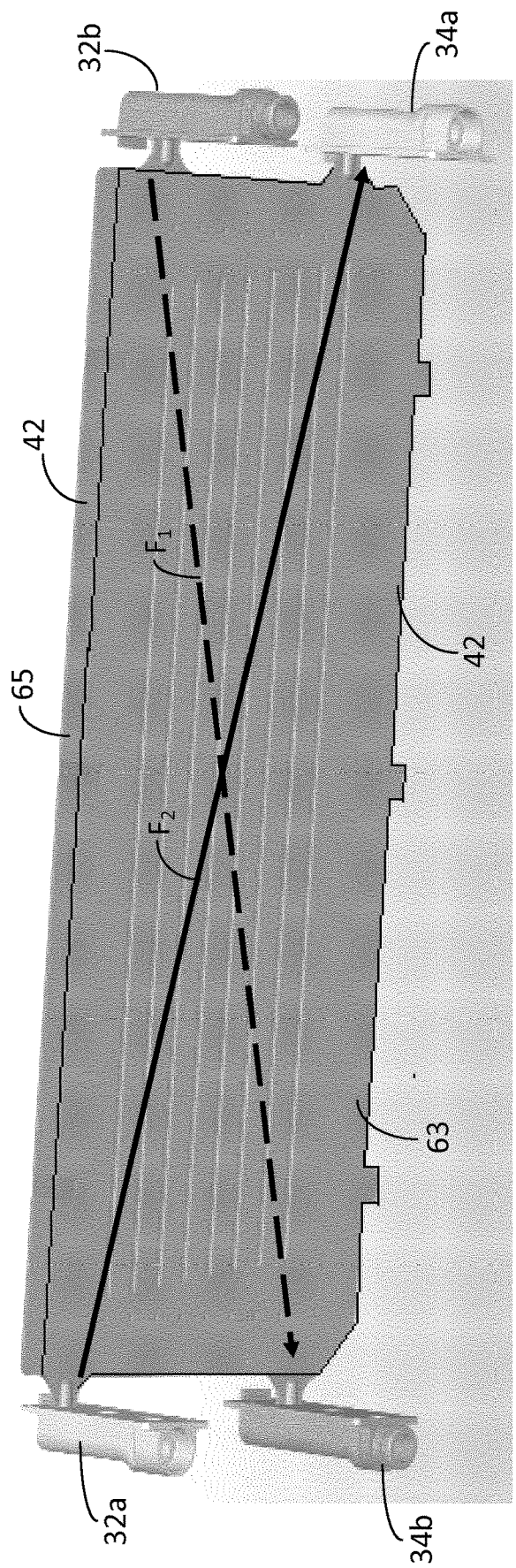
FIG. 5B is a top and front face view of the pair of plates depicted in FIG. 5A.

In FIGS. 5A and 5B (see also 6C) a pair of cooling plates 42 are illustrated. The cooling plates 42 in FIGS. 5A, 5B and 6C are disposed with their rear faces 65 facing one another. As such a gap exists between the cooling plates 42 that can accommodate a row, optionally of three cells 44, with each side of each cell 44 closest to a rear face 65 of a cooling plate 42. The coolant in the two cooling plates 42 flows in opposite directions F1 and F2. This may be described as bi-directional cooling or a cross-over of the cooling flow paths. The temperature of the three cells 44 disposed between the cooling plates 42 can be managed more carefully by the cooling system 100 of the present invention.

In a preferred, but nevertheless optional application of the cooling system 100 to the battery pack 20 having a configuration in which each row comprises three cells 44, each pair of heat exchanger plates 42 is required to control the temperature of three cells 44. The load placed on the cooling system 100 is therefore three times greater than the load placed on a cooling system of the prior art (for example that disclosed in WO2012/009145A2). The system for controlling temperature 100 of an embodiment of the invention manages such an increased load by directing the coolant flowing each side of a row of three cells generally diagonally and generally oppositely. As such coolant is input at the top left and top right of the row of three cells (adjacent opposite faces of the cells in the row) and flows a little across an upper part of each heat exchanger before flowing downwardly and travelling across the centremost cell and then out of the bottom right and bottom left of the row of three cells 44 respectively.

Figure 6A:
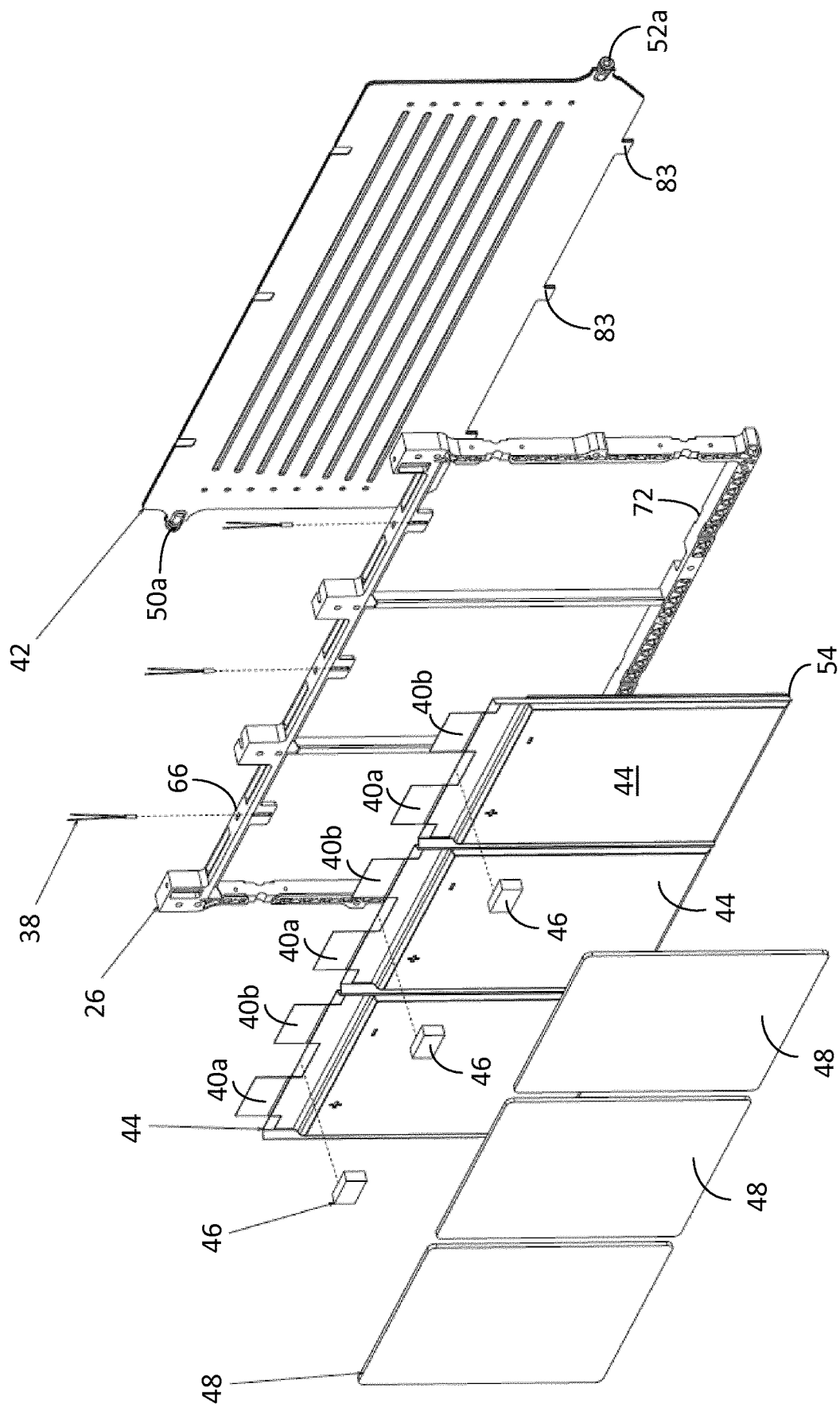
FIG. 6A is an exploded view of the assembly of a first modular frame member for use in forming a battery pack according to an embodiment of the invention.
Figure 6B:
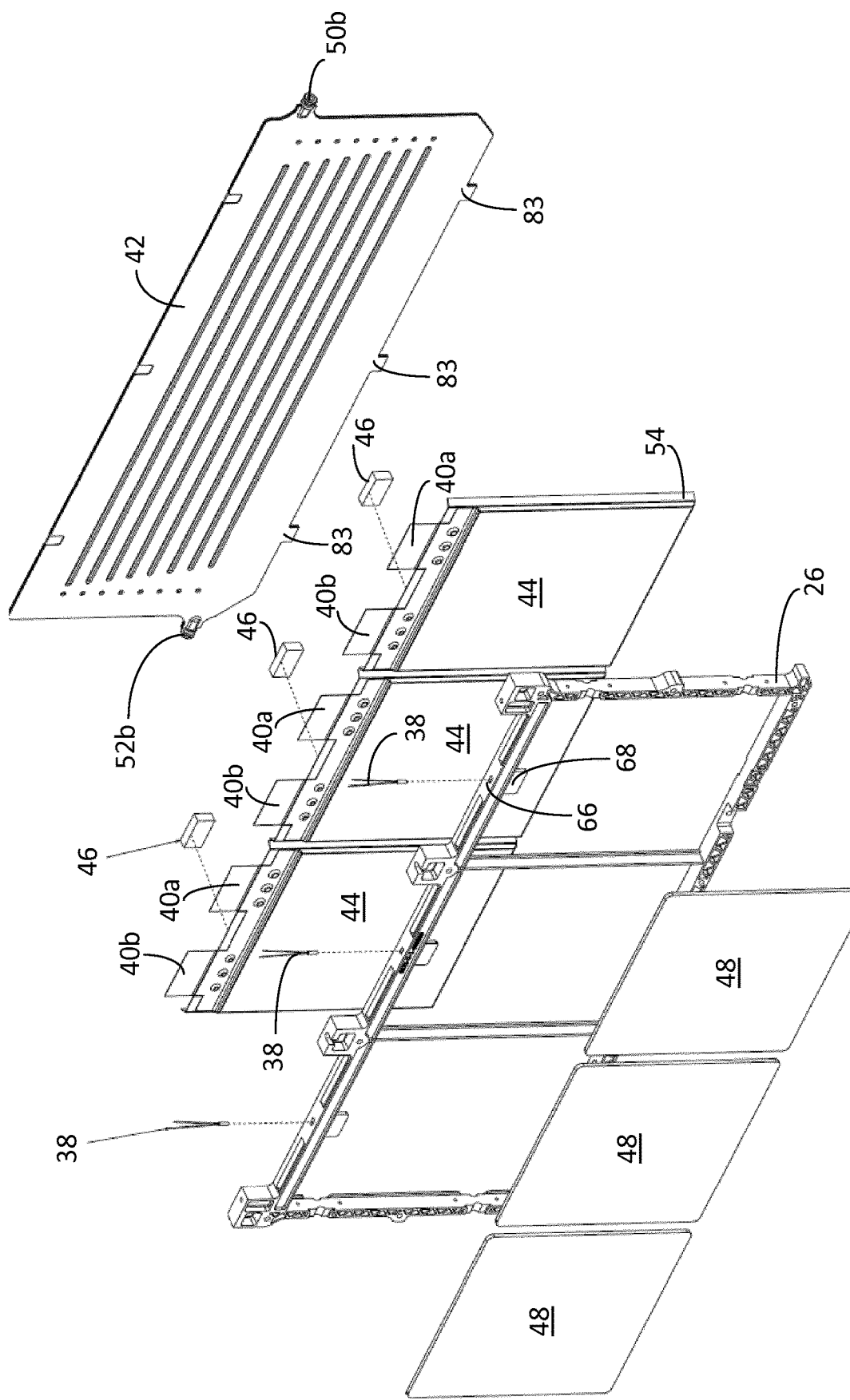
FIG. 6B is an exploded view of the assembly of a second modular frame member for use in forming a battery pack according to an embodiment of the invention.
Figure 6C:
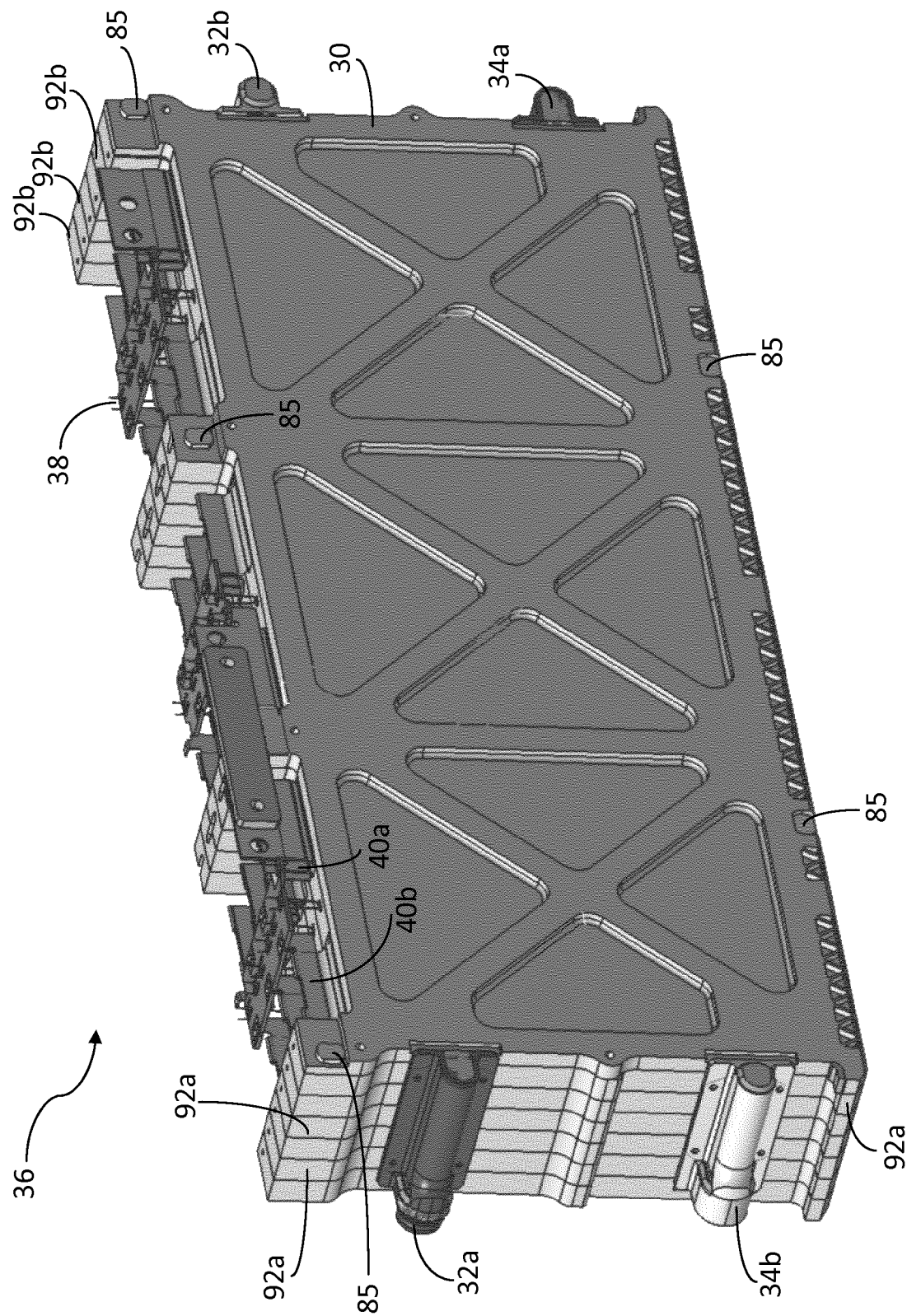
FIG. 6C is a perspective view of a cell module formed from six assembled frame members (three of the first modular frame members of FIG. 6A and three of the second modular frame members of FIG. 6B)
Figure 6D:
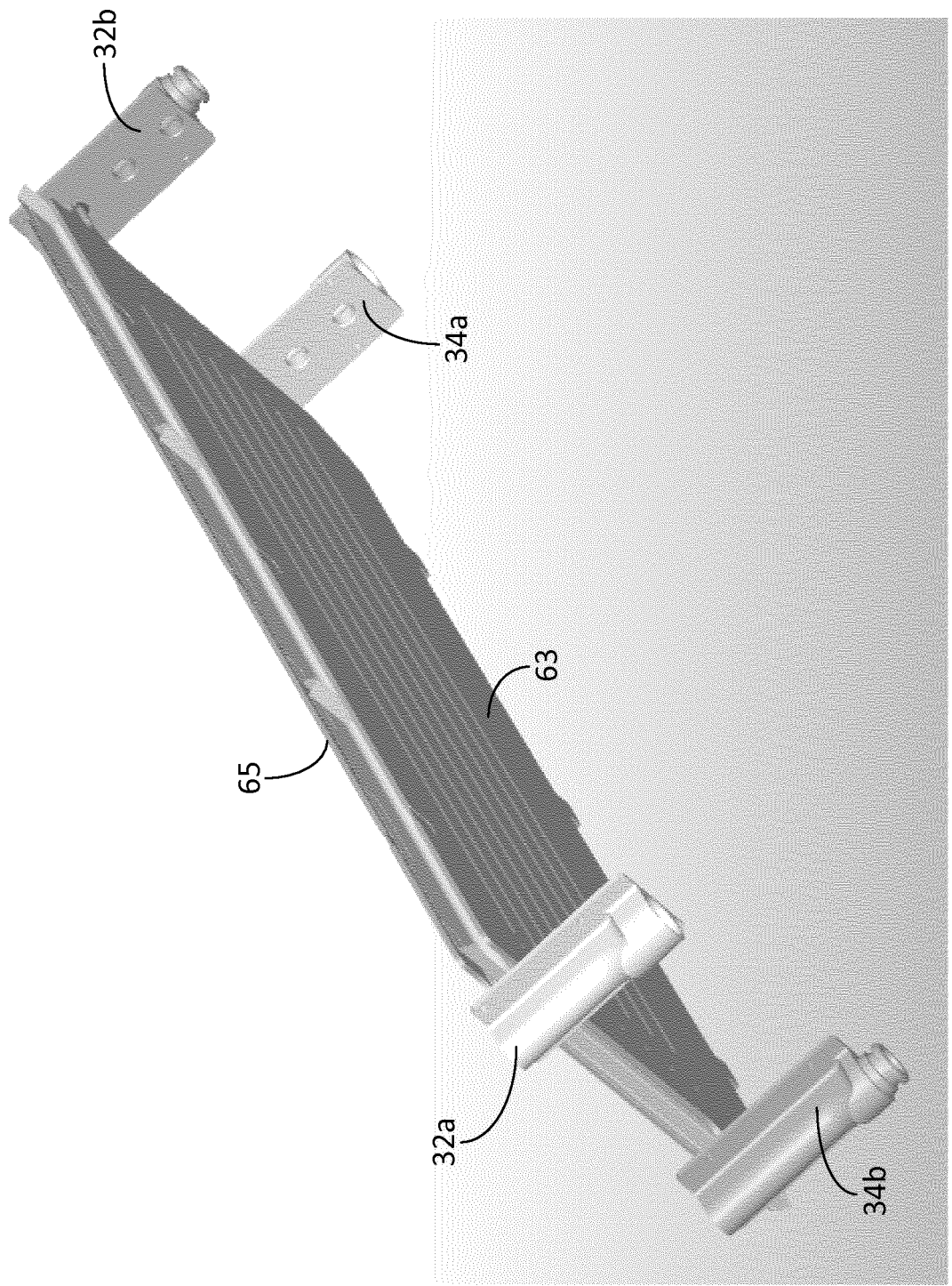
FIG. 6D is a perspective schematic view of a section of the cell module showing a pair of cooling plates disposed either side of a frame, the cells and other components are omitted for ease of illustrating the cooling plates and optional cooling system inlet and outlet manifolds.
Figure 7A:
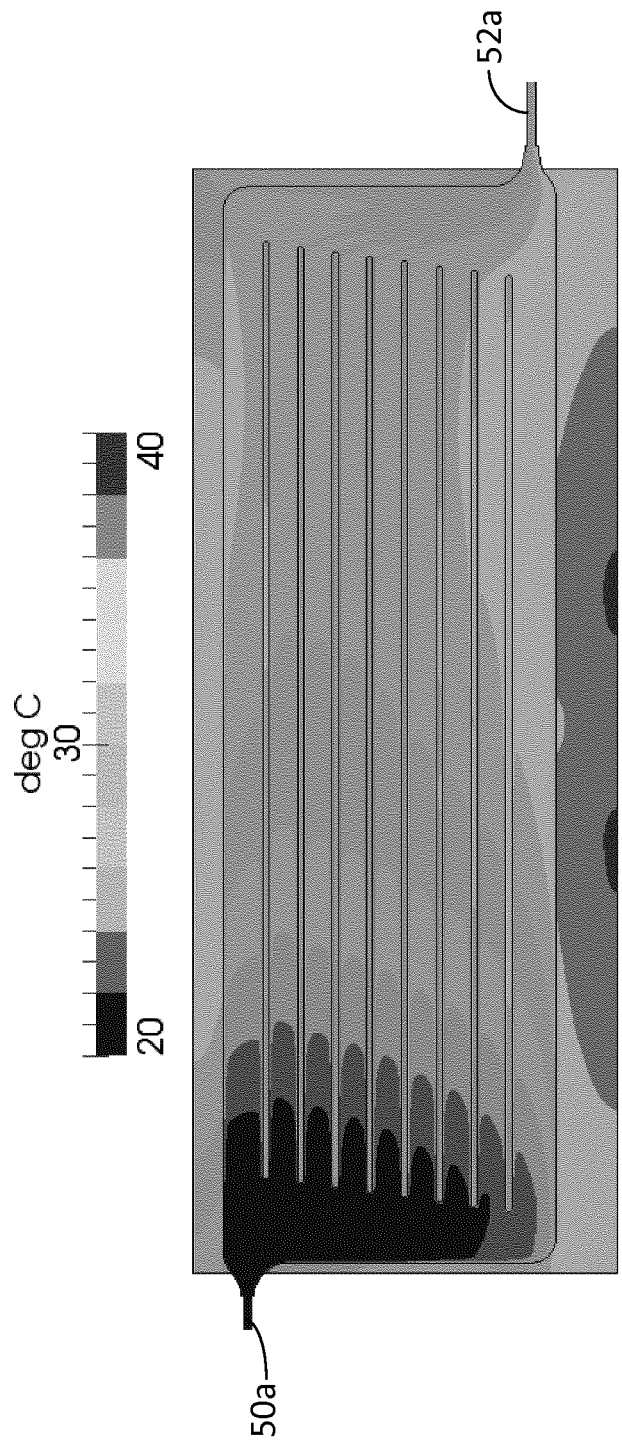
FIG. 7A is a computer modelled, graphical representation of the temperature of coolant flowing through one of a pair of cooling plates disposed adjacent to a row of three cells.

A computer model has been used to graphically represent the temperature distribution across each heat exchanger plate 42 of a pair of heat exchanger plates 42 in a an exemplary application (such as those shown in FIGS. 5A, 5B and 6C). In FIG. 7A, there is shown the temperature distribution of a first heat exchanger plate 42 (corresponding to the heat exchanger plate positioned front most in FIG. 5B). The flow direction is generally depicted as F2 in FIG. 5B. The graphical representation of FIG. 7A corresponds to a heat transfer fluid flowing in the heat exchanger plate 42 positioned rearmost in FIG. 5A. To some extent the flow path of the heat transfer fluid/coolant is illustrated by the temperature map. The coolant when input at the inlet 50a is coolest and is guided by the one or more physical formations across and down the cooling plate 42. As heat is transferred to the coolant from the cells 44, its temperature increases as it moves across the cooling plate 42 and down toward the outlet 52a.

Figure 7B:
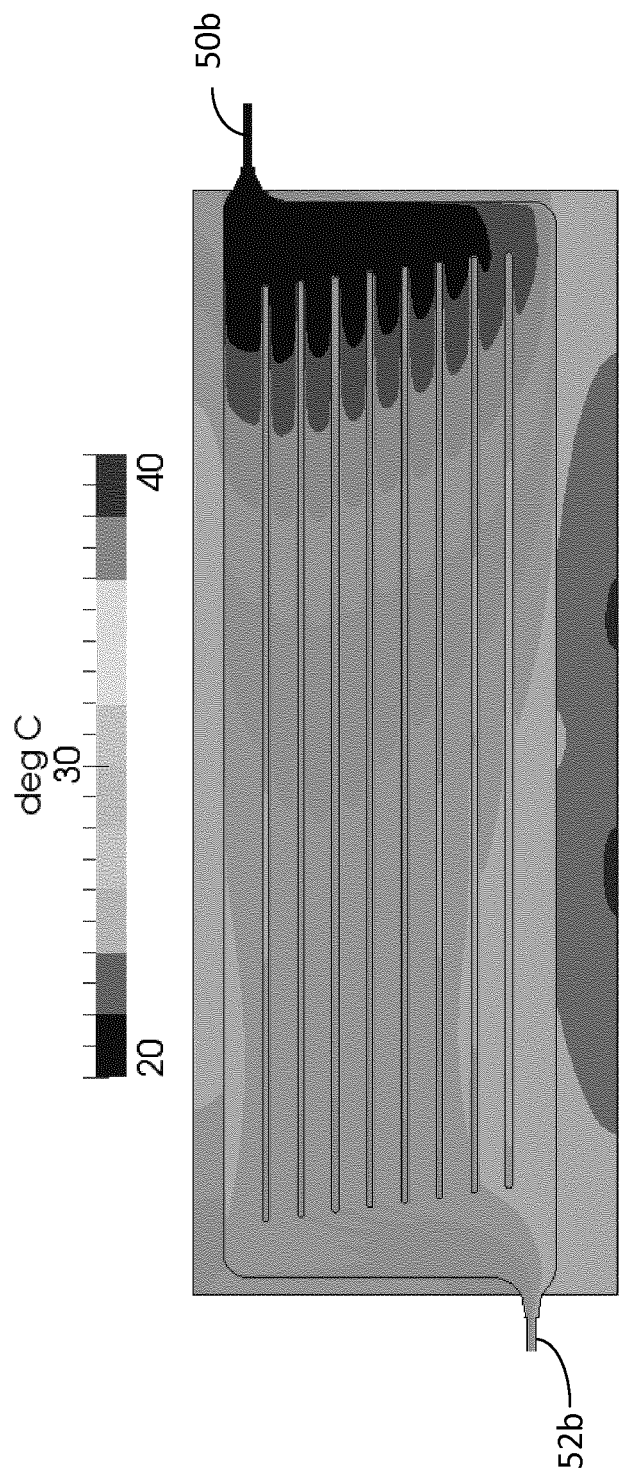
FIG. 7B is a computer modelled, graphical representation of the temperature of coolant flowing through the other of a pair of cooling plates disposed adjacent to a row of three cells.

Referring now to FIG. 7B, there is shown the temperature distribution of a second heat exchanger plate 42 (corresponding to the heat exchanger plate positioned front most in FIG. 5A. The temperature map depicted is of the heat exchanger plate 42 positioned front most in FIG. 5A and having a flow direction generally depicted as F1). To some extent the flow path of the heat transfer fluid/coolant is also illustrated. In the example shown, the coolant when input at the inlet 50b is coolest (as illustrated by the lighter shading) and is guided by the one or more physical formations across and down the cooling plate 42. As the coolant takes on heat from the cells 44, its temperature increases (as illustrated by the lighter shading) as it moves further down and across the cooling plate 42 and toward the outlet 52b.

Figure 7C:
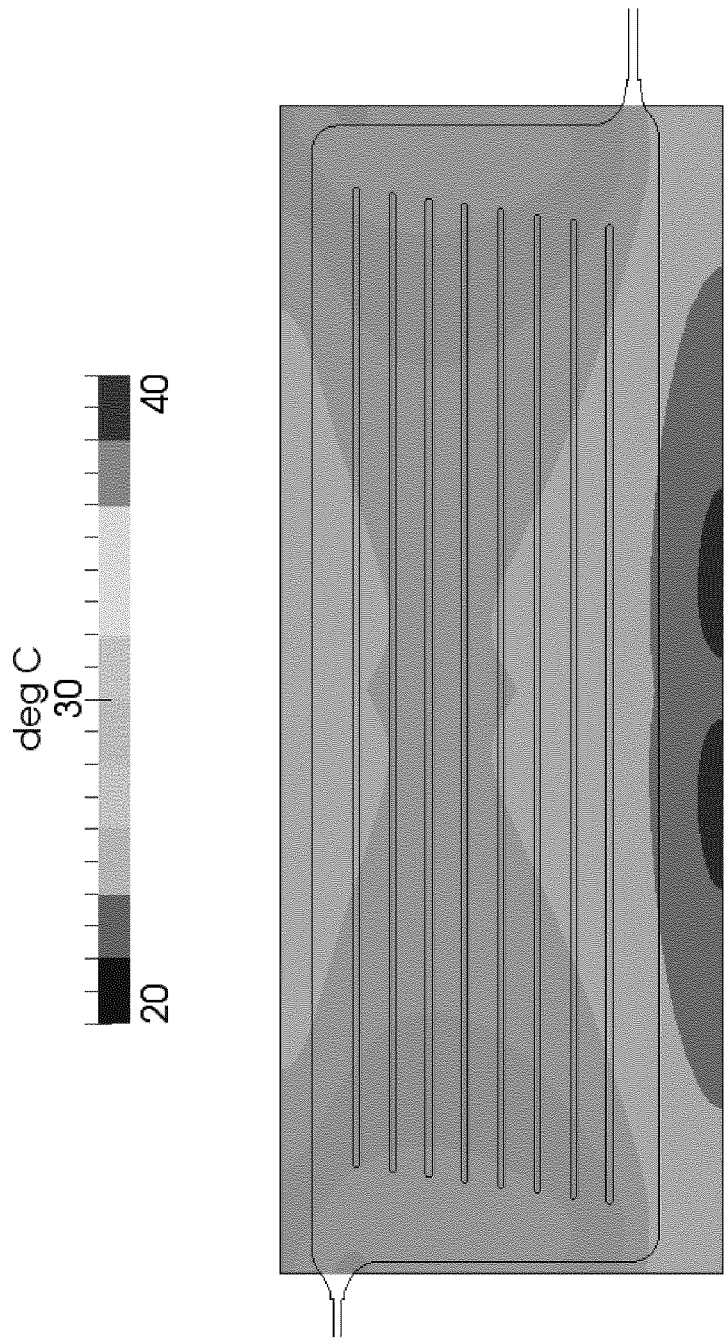
FIG. 7C is a graphical representation of the average temperature of the cooling plate temperatures depicted in FIGS. 7A and 7B and as such is representative of the temperature of three cells disposed between those cooling plates.

The overall effect on the three cells 44 positioned in a row between the cooling plates 42 is illustrated by considering the average temperature of the two cooling plates of FIG. 7A and FIG. 7B. This is illustrated in FIG. 7C. Because of the bi-directional flow and the flow path encouraged by the physical formations, the average temperature across the three cells 44 is well managed with the majority of the area of the three cells 44 being maintained substantially at an optimum operating temperature for the cells; with very few higher temperature areas; and optionally with a temperature differential that is less than about 10° C.

It will be seen that cooling may be considered as least effective for the centrally positioned cell 44, in other words the cell positioned furthest from the coolant inlets 50a, 50b. In other embodiments one or more coolant inlets may be differently positioned in order to differently control and manage cell 44 temperatures. However, the temperature of the centremost cell 44 is far better controlled than it would be without the temperature control system 100 of the present invention and the centremost cell 44 can be maintained within a working temperature range that is suitable for the performance of the battery pack 20. Furthermore, using lower temperature coolant and faster flow rates, the temperature of the centremost cell can be controlled to other temperatures than that depicted in the exemplary illustration of FIG. 7C.

It will be understood that the graphical representations of FIGS. 7A, 7B, 7C are for the purposes of illustrating one of many beneficial aspects of the invention and to aid the reader's understanding of the invention. The graphical representations do not necessarily indicate the performance, characteristic or any other quality of any product currently marketed or marketed in the future by the applicant, its successor in title or any of their respective subsidiary companies and/or affiliate companies. For the avoidance of all doubt whatsoever the schematic illustrations of FIGS. 7A, 7B and 7C are modelled examples and are not to be taken as being related in any way to the specification of any product currently marketed or marketed in the future by the applicant, its successor and of any of their subsidiary companies and/or affiliate companies.

Optionally, the system 100 for cooling a battery pack 20 according to another envisaged embodiment is used for controlling the temperature of a battery pack comprising a cell module having rows of more than three cells 44. In such an arrangement, the flow rate of the coolant may be increased and/or the cooled temperature of the coolant decreased and/or the type of coolant changed in order to ensure sufficient cooling of all cells 44 and/or the capacity of the heat exchanger plates 42 increased to allow for a greater volume of heat transfer fluid to circulate.

The cooling plates 42 allowing for coolant to circulate either side of each cell at a controlled flow rate and being cooled by a heat transfer fluid conditioner 105 may provide for improved and more efficient cooling of the cells 44 than metallic blocks or solid metallic sheets. The inlet of coolant proximate the hottest part of the cells 44 further may improve the effectiveness of the cooling system 100. Enabling coolant to flow in different (optionally opposing) directions across the or each cell 44 in each row may further improve the efficiency and/or the effectiveness of the cooling system 100 in controlling the temperature of the individual cells. Guiding the path taken by the coolant flowing internally of the cooling plate 42 such that it travels more substantively in a direction that follows the distribution of heat across the cells 44 may further advantageously effect the efficiency and effectiveness of the cooling system 100.

According to a further optional aspect of an embodiment of the invention, one or more cells 44 may be affixed, with other components (such as the cooling plates 42), to a frame 26 to form first modular frame members 92A (also referred to as 'A'-frames) and second modular frame members 92B (also referred to as 'B'-frames) as shown schematically in exploded view FIGS. 6A and 6B respectively. The first and second modular frame members 92A, 92B are affixed in a stacked alternating arrangement, optionally with additional components (as described below) to form cell modules 36 such as that shown in FIG. 6C, wherein each row of one or more cells 44 is disposed between a pair of cooling plates 42 of the cooling system 100 such that each side of the cell pouch 44 is in thermal contact with a face 63, 65 of a cooling plate and thereby in thermal contact with the flowing coolant.

An optional, exemplary and non-limiting frame 26 according to an embodiment of the invention is illustrated in FIGS. 6A and 6B.

The frame 26 may be beneficial because it optionally allows more than one cell 44 to be disposed next to one another in rows of more than one cell 44 wide, such that the cells 44 can be densely packed together and allows for the easy assembly of the heat exchanger plate 42 next to the row of cells 44. Once assembled into a frame 26 the more than one cell 44 can be more easily handled for the assembly of a matrix battery pack 20 than might otherwise be the case without the frame 26. In one optional embodiment, the frame 26 is configured and arranged to house three cells, side-by-side, this is shown in FIGS. 6A and 6B. In forming a battery pack 20, a plurality of frames 26 each optionally comprising more than one cell 44 and a cooling plate 42 adjacent thereto are assembled together (as is described below) to form a compact battery pack 20 arrangement.

It will be understood upon reading the foregoing description of the cell module 36, battery pack 20 and cooling plates 42 that the system 100 for cooling a battery pack 20 of the present invention may be applied to other, different battery pack 20 structures and the application of the system 100 for cooling a battery pack to the specifically illustrated battery pack 20 shown and described herein is not in any way limiting the cooling system 100 of the present invention and component parts thereof to only the application illustrated.

Referring now to the cell modules 36, each cell module 36 optionally comprises an alternating sequence of first and second modular frame members 92A, 92B; an additional cooling plate (not shown in FIG. 6); and a pair of end plates 30 (only one shown in FIG. 6). Each of the first and second modular frame members 92A, 92B comprises (not necessarily in this sequence): a frame 26; a cooling plate 42; one or more rechargeable cells 44 (in this example three cells 44); one or more foam cells (foam layers) 48 (in this example three foam cells (foam layers) each of about 1.6 mm thickness); one or more temperature sensors 38 (in this example three thermistors); and one or more foam blocks 46 (in this example three foam blocks are used for each temperature sensor of each cell 44). The assembly of each of the first and second modular frame members 92A, 92B is illustrated in FIGS. 6A and 6B respectively. Before describing the assembly of the first and second modular frame members 92A, 92B, the structural features of the exemplary and optional frame 26 of FIG. 6A will be described in further detail.

Each frame 26 optionally forms the structural foundation of each of the first and second modular frame members 92A, 92B and as such provides a structure onto which the various, aforementioned components, including the cooling plates 42 can be housed or mounted. The frames 26 additionally, optionally, provide for the compact housing and/or easy assembly of: a cooling plate 42; the temperature sensor 38 for each cell; the inlet and outlets 50a, 50b, 52a, 52b of the cooling system; and the foam cells (foam layers) 48. Additionally, the frames 26 may provide a means for affixing or attaching cells 44 together in stacks or cell modules 36 so that the cells 44 can be compactly, efficiently and securely stacked together in a dense configuration. To achieve these functions, the frame 26 is provided with a number of features, any or all of which may be used in isolation of any of the other features. In other words, the features of the illustrated frame 26 are not necessarily structurally and functionally related to one another unless otherwise explicitly stated. Nevertheless it will be recognised that the features when provided together form the frame 26 according to a preferred, but nevertheless optional embodiment.

The body of the frame 26 of the exemplary embodiment illustrated comprisesthree sections, each for housing an individual cell 44, in part by vertical dividers.

Referring in more detail to the exemplary and optional frame 26 of FIG. 6A, the substantially rectangular body is optionally moulded from plastics material.

Referring again to FIG. 6A, the frame 26 optionally additionally comprises appropriately shaped, sized and configured pairs of apertures in the top section of each section, through which the tab terminals 40a, 40b of a cell 44 can be passed such that each tab terminal 40a, 40b is supported by the edge of the aperture and spaced from the adjacent tab terminal 40b, 40a of the same cell 44 and/or where present, the adjacent cell 44. Additionally, the apertures and the edges of those apertures may provide a further mechanical retention of the cell 44 to assist with securing the cell 44 within the frame 26 and to enable consistent positioning of the cells 44 so that, for example, a temperature sensor 38 (such as a thermistor) can be reliably and accurately coupled to a cell 44, which will be held within the section of the frame at a set position (giving consideration to manufacturing tolerances).

The top section 96 optionally also comprises appropriately shaped, sized and configured apertures 66 into which a temperature sensor 38 can be inserted, optionally for contacting the cell 44 at a predetermined, optimum temperature sensing location, for determining and monitoring the temperature of the cell 44.

Optionally the apertures and 66 are formed substantially centrally of the top section of the frame 26 such that these features are similarly presented when the frame 26 is presented with its front face first or with its rear face first (see FIGS. 6A and 6B).

The bottom section of the frame 26 optionally comprises one or more formations or cooling plate location notches sized, shaped and/or otherwise configured in complementary manner with an optional formation, shaped portion, projection or cooling plate tab of the cooling plate 42 (see FIGS. 6A and 6B). The cooling plate tab can be located in a cooling plate location notch to facilitate the assembly of the first and second assembled modular frame members 92A, 92B; to ensure correct positioning and alignment of the cooling plate 42 and optionally to at least temporarily affix the cooling plate 42 to the frame 26 to assist in holding together the components of each first and second modular frame member 92a, 92b during their assembly.

Preferably, but nevertheless optionally, the sides of the frame 26 are each provided with one or more shaped formation(s). These formations may also be referred to as cooling plate inlet/outlet formations. When two frames 26 are placed next to one another (side by side), the formation of one frame 26 mates with the formation of the other frame 26 such that together, the two formations of the two frames 26 create an aperture appropriately shaped, sized and configured to receive and support an inlet or outlet 50a, 50b; 52a, 52b of the cooling plate 42. A standard frame 26 can be manufactured that can be used for forming first and second modular frame members 92a, 92b that are of different construction and/or for forming first and second modular frame members 92a, 92b that have differently positioned cooling plate 42 inlets or outlets 50a, 50b; 52a, 52b. The benefit of this may be better understood upon reading the following description of how the frames 26 are used to form first and second modular frame members 92a, 92b and how those first and second modular frame members 92a, 92b are then used to form modules 36.

Turning to the construction of the first modular frame member 92A, reference is made to FIG. 6A, which shows, in exploded view, the primary components (cooling plate 42, frame 26, three thermistors 38; three cells 44; three foam blocks 46; and three Foam cell (foam layer)s 48) of the first modular frame member 92A. The first modular frame member 92A may optionally be assembled by placing the components in order on top of one another, for example, the cooling plate 42 may be disposed lower most and with relative movement between the cooling plate 42 and frame 26, the cooling plate 42 is located onto the rear face of the frame 26. A cell 44 may be placed into each section of the frame 26 from the front face thereof. Optionally, each cell 44 may be manipulated into the section by threading the tabs 40a, 40b into the apertures and then pushing the cell wings 54 past the sides and/or dividers, optionally to snap-fit the cell 44 in place. A thermistor 38 is then inserted into each aperture of each section and disposed in contact with a cell 44. The foam blocks 46 may then be placed between the tabs 40a, 40b of the cells 44 and finally a foam cell (foam layer) 48 placed on top of each cell 44. An affixing agent or means, for example a resin, adhesive or mechanical fixing means may be placed within the frame and/or between the primary components and/or applied to the outside of the part-assembled structure. The affixing agent may be any chemical and/or mechanical affixing agent. Optionally a suitable chemical affixing agent may be a resin which may optionally be, for example a two-part epoxy based resin such as Stycast®. Optionally, the resin of the assembled first modular frame member 92A may be cured by heat, optionally by placing the assembled first modular frame member 92A in an oven. The completed and affixed first modular frame member 92A is shown schematically in FIG. 5A.

Turning to the construction of the second modular frame member 92B, reference is made to FIG. 6B, which shows, in exploded view, the primary components (cooling plate 42; three foam blocks 46; three cells 44; frame 26; three thermistors 38; and three foam cells (foam layers 48 of the second modular frame member 92B. The second modular frame member 92B may optionally be assembled by placing the components in order on top of one another, for example, the foam cells foam layer(s) 48 may be disposed lower most and with relative movement between the foam cells 48 and frame 26, the foam cells 48 located onto the rear face of the frame 26. A cell 44 may be placed into each section of the frame 26 from the front face thereof. Optionally, each cell 44 may be manipulated into the section by threading the tabs 40a, 40b into the apertures and then pushing the cell wings 54 past the sides and/or dividers, optionally to snap-fit the cell 44 in place. A thermistor 38 is then inserted into each aperture 66 of each section and disposed in contact with a cell 44. The foam blocks 46 may then be placed between the tabs 40a, 40b of the cells 44 and finally a cooling plate 42 placed on top the cells 44 and located into the frame notches. An affixing agent or means, for example a resin, adhesive or mechanical fixing means may be placed within the frame and/or between the primary components and/or applied to the outside of the part-assembled structure. The affixing agent may be any chemical and/or mechanical affixing agent. Optionally a suitable chemical affixing agent may be a resin which may optionally be, for example be a two-part epoxy based resin such as Stycast®. Optionally, the resin of the assembled second modular frame member 92B may be cured by heat, optionally by placing the assembled second modular frame member 92B in an oven.

Figure 8:
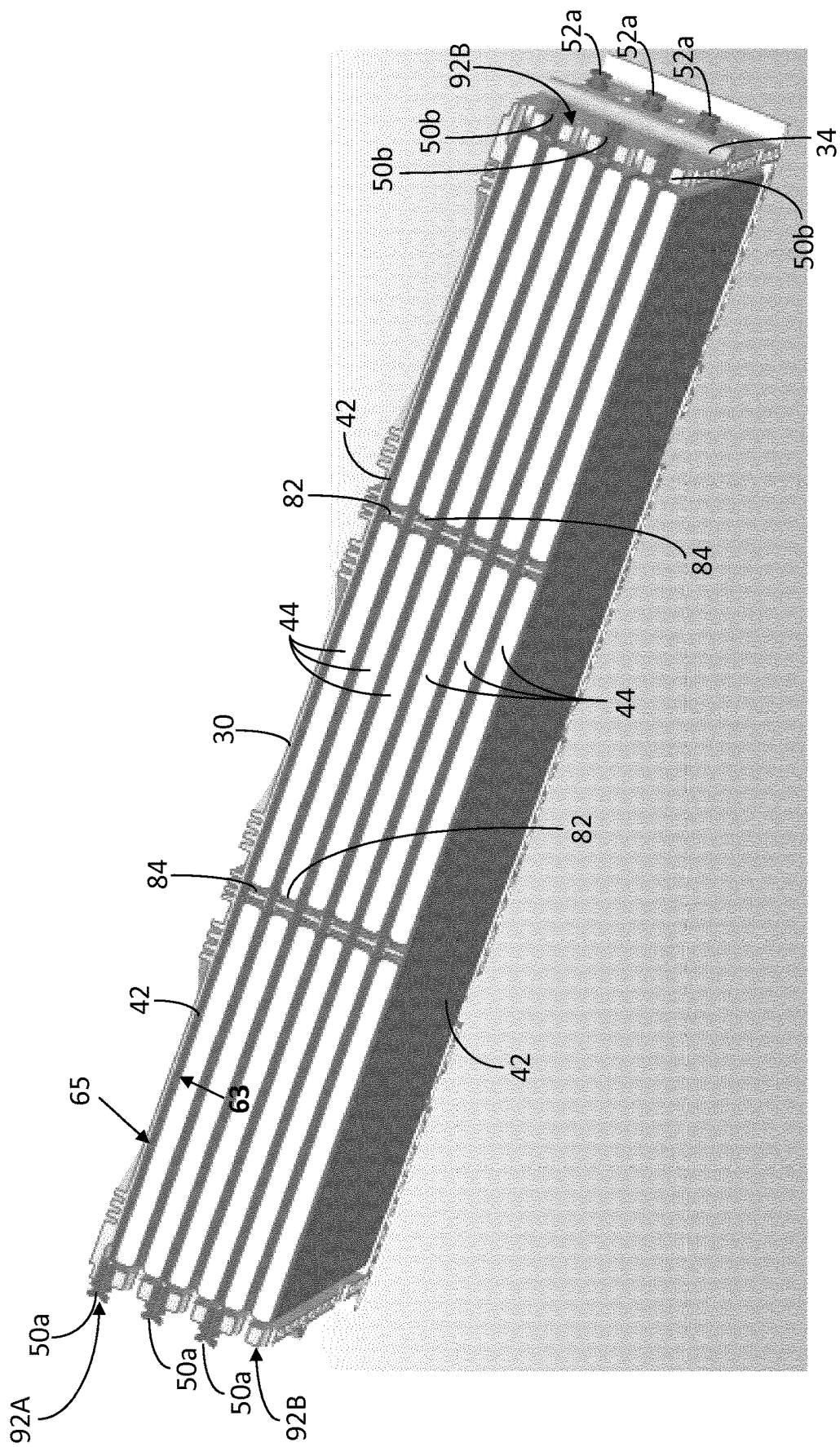
FIG. 8 is a perspective, schematic illustration of a cross-section though a module comprising six assembled frame members according to an embodiment of the invention.

To form a cell module 36 from the first and second modular frame members 92A, 92B, the first and second modular frame members 92A, 92B are stacked in an alternating series. In one embodiment a module comprises three first modular frame members 92A and three second modular frame members 92B, two end plates and an extra cooling plate 42. The extra cooling plate 42 is provided so that each cell 44 is disposed or sandwiched between two cooling plates 42. In this way the cooling or temperature management of each cell 44 is optimised. Optionally a cell module 36 may be completed by threading bolts of sufficient length and suitable strength through two or more of the primary module affixing holes. A perspective view of the cell module 36 is shown in FIG. 6C and a cross-sectional schematic view is shown in FIG. 8.

It can be seen that each set or row of three cells 44 is sandwiched between two cooling plates 42. Inlet and outlet manifolds 32a, 32b, 34a, 34b of the cooling system 100 may be connected to a series of three inlets or three outlets 50a, 52a; 50b, 52b which are staggered in their positioning. The first and second modular frame members 92A, 92B are formed and arranged such that their respective cooling plate inlets 50a, 50b and outlets 52a, 52b are disposed on opposite sides of the module 36 from one another. In other words, the inlet 50a of the cooling plate 42 of the first modular frame member 92A is disposed on the opposite side of the cell module 36 to the inlet 50b of the cooling plate 42 of the second modular frame member 92B. As described above, this permits the bi-directional flow of heat transfer fluid in two cooling plates 42 disposed either side of a row of cells 44.

For example, see FIG. 6C, where it can be seen that a single inlet manifold 32a may be connected across three cooling plate inlets 50a, each provided by the three first modular frame members 92A. The inlet manifold 32a connects the inlets 50a to the cooling system 100 to provide temperature controlled heat transfer fluid from the heat transfer fluid conditioner 105 (where the temperature of the heat transfer fluid is controlled or conditioned (usually the heat transfer fluid will be cooled) via the pump 104a and into the cooling plates 42. Similarly, a second inlet manifold 32b is disposed on the opposite side of the cell module 36 to serve the three cooling plate inlets 50b provided by the three second modular frame members 92B. The outlets 52a of the three cooling plates 42 of the first modular frame members 92A are similarly connected by a single manifold 34a for connecting those outlets 52a to the cooling system 100 for pumping out the (usually) warmed coolant from the cooling plates 42. Similarly, the outlets 52b of the three cooling plates 42 of the second modular frame members 92B are similarly connected by a single manifold 34b.

The structure and arrangement of the cell module 36 enables the same frames 26 and cooling plates 42 to be used in an alternating assembly to enable, among other things, the manifolds 32a, 32b, 34a, 34b to be fitted to the cell module 36. Despite the size of these components being greater than the width of the frames 26, the presence of the manifolds 32a, 32b, 34a, 34b does not cause an increase in the spacing required between frame members 92A, 92B because of the alternating position of the inlets and outlets 50a, 50b, 52a, 52b and the overall dimension of the cell module 36 is kept as compact as possible. The alternating formation of the cooling plates 42 by forming first and second types of modular frame member may enable the cooling plates 42 to be easily assembled in a front face 63 to front face 63 pairing and then a rear face 65 to rear face 65 pairing. The alternating formation of the cooling plates 42 may enable the cells 44 to be very closely packed whilst at the same time providing sufficient room for the manifolds 32a, 32b, 34a, 34b and inlet/outlets 50a, 50b, 52a, 52b.

Optionally the manifolds 32a, 32b, 34a, 34b may be affixed by screws to the sides of the frame 26.

To complete a battery pack 20, the cell module 36 may be stacked with one or more other cell modules 36 (of similar of different modular frame number) to further increase the number of cells 44 and therefore the power output of the battery pack 20. The terminals 40a, 40b of each cell 44 are coupled to appropriate electrical circuitry for controlling the electrical charge provided to and taken from each cell 44. The cooling system 100 is attached to the cell modules 36. The battery pack 20 optionally may be packaged and housed within a vehicle 10 as shown in FIG. 1.

Optionally and beneficially the frames 26 may be sufficiently symmetrical that a frame 26 from a single moulding tool is suitable for forming the frames 26 and yet the frames 26 can be used to make the first and second modular frame members 92A, 92B so that a stacked arrangement that sandwiches all cells 44 between two cooling plates 42 can be formed. This is a cost effective and efficient design. In other embodiments however, two distinct and different frames may be used for forming the first and second modular frame members 92A, 92B.

It can be appreciated that various changes may be made within the scope of the present invention.

The invention claimed is:

1. A system for controlling the temperature of a rechargeable electric battery pack comprising a plurality of rechargeable electrochemical storage cells disposed in a plurality of rows of one or more cells each, the system comprising two heat exchanger plates for each of said rows of one or more cells, each said row being disposed between the two heat exchanger plates for said row, and each heat exchanger plate being arranged to allow heat transfer fluid to flow internally thereof;

wherein a first of the two heat exchanger plates for a first of said rows is configured and/or arranged to allow heat transfer fluid to flow in a first general direction;

wherein a second of the two heat exchanger plates for said first row is configured and/or arranged to allow heat transfer fluid to flow in a second general direction;

wherein the first and second general directions are substantially different to one another; and wherein each heat exchanger plate of the system comprises an inlet and an outlet, and wherein, in use, the inlet is disposed at a higher elevation than the outlet.

2. The system of claim 1, wherein the first and second general directions are generally diagonal and are generally opposite to one another.

3. The system of claim 1, wherein the inlet of each heat exchanger plate is disposed on the opposite side of the heat exchanger plate to the outlet.

4. The system of claim 1, wherein each heat exchanger plate comprises two faces and wherein one or more physical formations is formed on one or both of the two faces for providing an internal guide for urging heat transfer fluid when flowing therein to follow a preferred pathway.

5. The system of claim 4, wherein the inside surfaces of the heat exchanger plates are configured to cause a tumbling movement of the heat transfer fluid flowing therein which assists in the heat transfer fluid being urged to follow a preferred pathway.

6. The system of claim 4, wherein the one or more physical formations on one or both of the faces comprises one or more indentations and/or one or more fins.

7. The system of claim 6, wherein the one or more physical formations on one or both of the faces comprises a series of fins arranged in substantially parallel relationship.

8. The system of claim 7, wherein a start and termination of each fin of the series of fins is staggered or offset from a start and termination of each other fin in a gradual and linear manner.

9. The system of claim 6, wherein the one or more physical formations on one or both of the faces further comprises two spaced linear series of indentations and wherein each indentation of the two series is substantially spaced from and substantially in horizontal alignment with a start or termination of a fin.

10. The system of claim 9, wherein the one or more physical formations is formed on both of the faces and comprises two linear series of eight indentations each and eight fins each having a length of about 160 mm, 320 mm or 480 mm and/or each spaced apart by between about 15 mm and about 20 mm.

\* \* \* \* \*